United States Patent [19]

Yamada et al.

[11] 4,363,776

[45] Dec. 14, 1982

[54] METHOD AND APPARATUS FOR THE FORMATION OF A SPHEROMAK PLASMA

[75] Inventors: Masaaki Yamada, Lawrenceville; Harold P. Furth; Thomas H. Stix, both of Princeton; Alan M. M. Todd, Princeton Junction, all of N.J.

[73] Assignee: The United States of America as represented by the United States Department of Energy, Washington, D.C.

[21] Appl. No.: 173,555

[22] Filed: Jul. 30, 1980

[51] Int. Cl.³ .............................................. G21B 1/00
[52] U.S. Cl. .................................. 376/137; 376/133; 376/124
[58] Field of Search ............... 376/121, 124, 133, 134, 376/137, 139, 140

[56] References Cited

U.S. PATENT DOCUMENTS

| 3,093,569 | 6/1963 | Post | 376/139 |
| 4,229,679 | 10/1980 | Lode | 376/140 |
| 4,267,488 | 5/1981 | Wells | 376/179 |
| 4,302,284 | 11/1981 | Ohkawa | 376/133 |

OTHER PUBLICATIONS

Soviet Physis-Technical Physics, vol. 15, No. 5, 11/79, pp. 734-740, Kozyrev et al.

*Primary Examiner*—Sal Cangialosi

[57] ABSTRACT

A method and apparatus for forming a detached, compact toroidally shaped spheromak plasma by an inductive mechanism. A generally spheroidal vacuum vessel (1) houses a toroidally shaped flux ring or core (2) which contains poloidal and toroidal field generating coils. A plasma discharge occurs with the pulsing of the toroidal field coil, and the plasma is caused to expand away from the core (2) and toward the center of the vacuum vessel (1). When the plasma is in an expanded state, a portion of it is pinched off in order to form a separate, detached spheromak plasma configuration. The detached plasma is supported by a magnetic field generated by externally arranged equilibrium field coils (5).

32 Claims, 36 Drawing Figures

THE SPHEROMAK DEVICE.

THE SPHEROMAK DEVICE.

OBLATE SPHEROMAK WITH LARGE CENTER HOLE.

DESIRABLE RANGE OF SIZE AND DENSITY FOR AVOIDANCE
OF MHD FLUTES AND CURRENT DRIVEN MICROINSTABILITIES.

DESIRABLE OPERATING REGIME FOR A SPHEROMAK
PLASMA WITH $\beta_0^* = 2\%$

MARSHALL-GUN APPROACH

REVERSE-FIELD THETA PINCH APPROACH

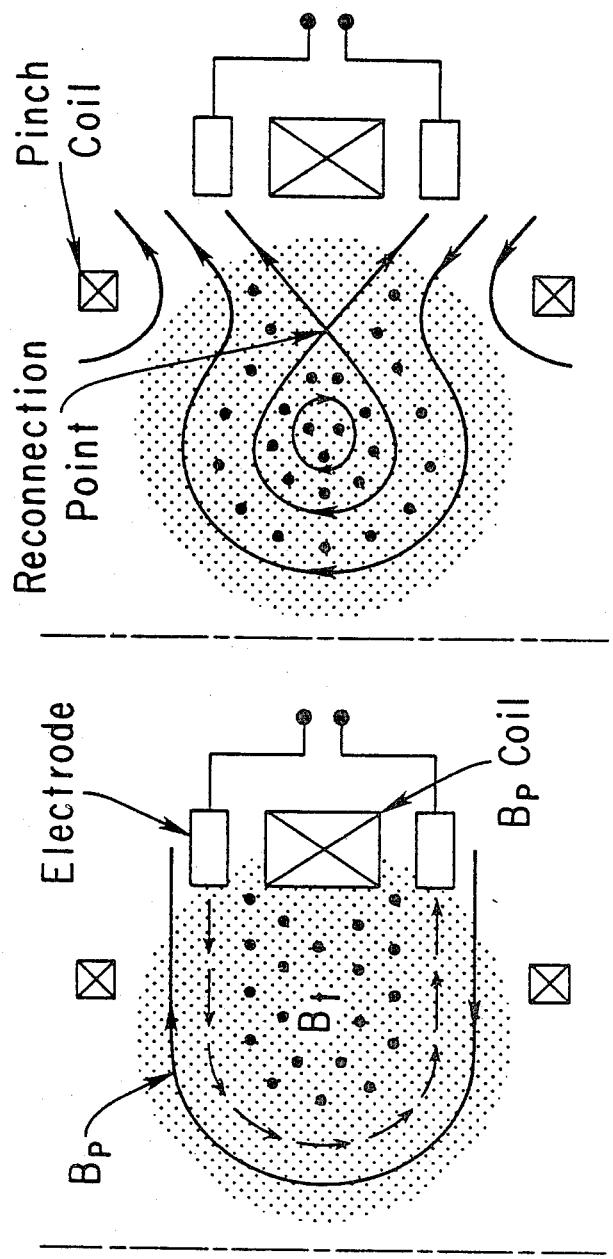

Quasistatic Formation Using Induction

TOP VIEW OF THE FLUX RING OF THE SPHEROMAK.

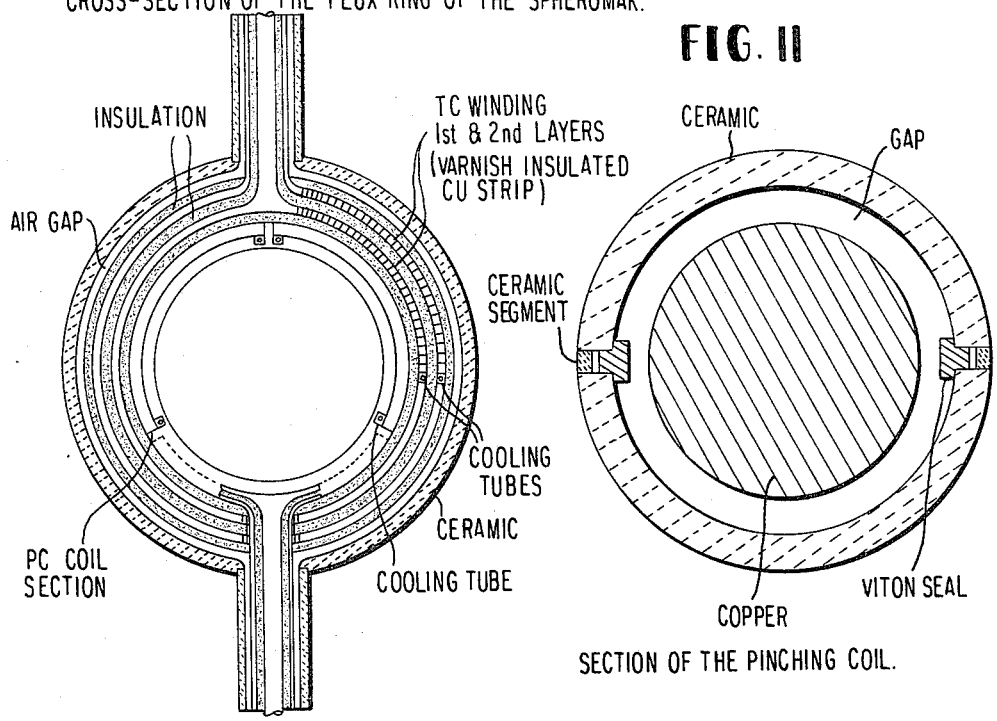
FIG. 10 CROSS-SECTION OF THE FLUX RING OF THE SPHEROMAK.
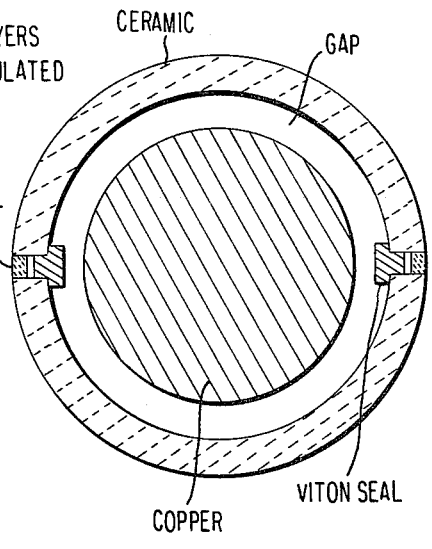
FIG. 11 SECTION OF THE PINCHING COIL.
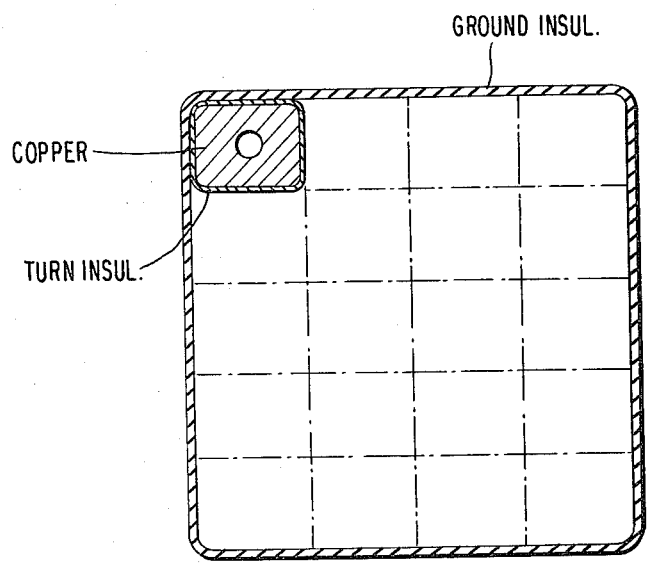
FIG. 12 SECTION OF AN EQUILIBRIUM FIELD COIL.

SCHEMATIC DIAGRAM OF POWER SUPPLY CONNECTIONS OF THE TC COILS.

TIME VARIATION OF THE CURRENTS IN THE PLASMA EF, TC, PN, AND PC COILS.

SPHEROMAK PC COIL POWER SUPPLY

SCHEMATIC DIAGRAM OF POWER SUPPLY CONNECTIONS OF THE PC COILS.

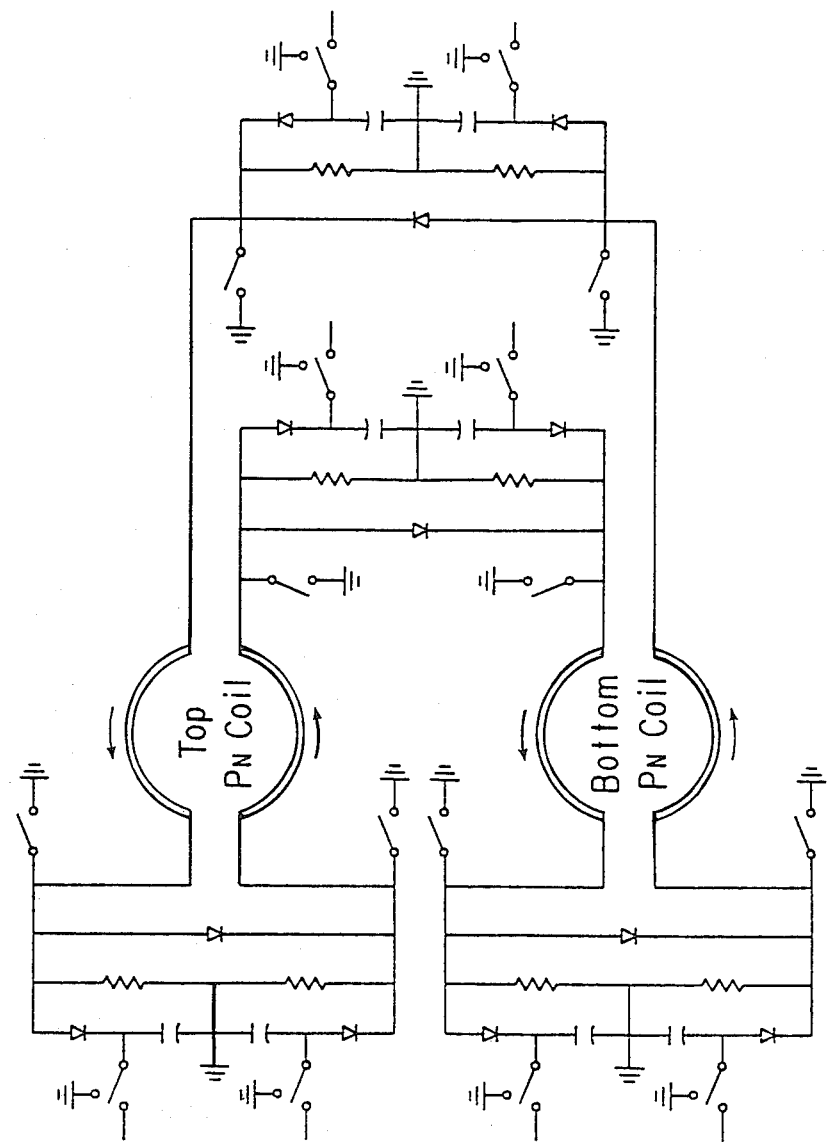
FIG. 16 SPHEROMAK P_N COIL POWER SUPPLY
SCHEMATIC DIAGRAM OF POWER SUPPLY CONNECTIONS OF THE PN COILS.

FIG. 17  SPHEROMAK EF SUPPLY
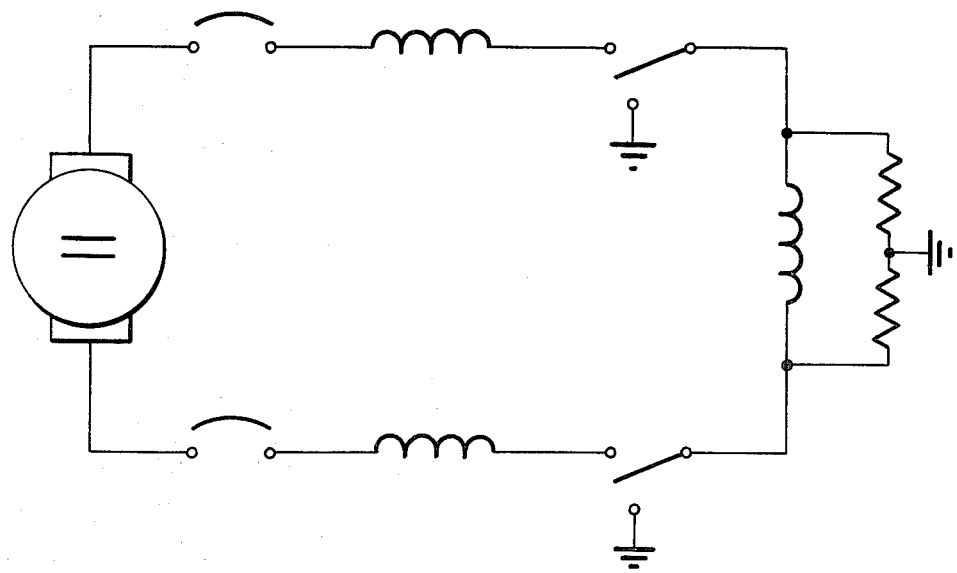
SCHEMATIC DIAGRAM OF POWER SUPPLY CONNECTIONS
OF THE EF COILS.
FIG. 18
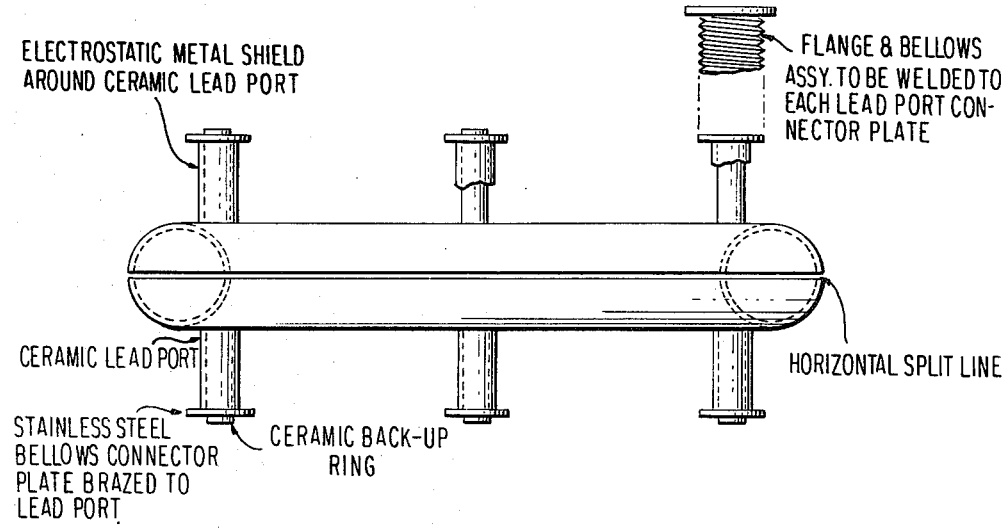

FIGS. 19A-J POLOIDAL MAGNETIC FLUX CONTOURS AT VARIOUS STAGES DURING THE FORMATION PROCEDURE. VACUUM FIELD IS DENOTED BY DOTTED LINES, AND THE FIELD IN THE PLASMA REGION BY SOLID CONTOURS. THE BLANK REGIONS IN THE UPPER RIGHT CORNERS CONTAIN UNPLOTTED VACUUM FIELD.

MIDPLANE (Z=0) FIELD AND CURRENT DENSITY FOR THE
EQUILIBRIUM OF FIG.19j. THE MAGNETIC FIELDS ARE
NORMALIZED TO $B_0=0.91$ T, AND THE CURRENT DENSITIES TO
$J_{\phi 0}= 9.53$ MA/m$^2$.

METHOD AND APPARATUS FOR THE FORMATION OF A SPHEROMAK PLASMA

The U.S. Government has rights in this invention pursuant to contract AF-02-30-11 between the United States Department of Energy and Princeton Plasma Physics Laboratory.

BACKGROUND OF THE INVENTION

This invention relates to the confinement of plasmas by magnetic fields and, more particularly, to an apparatus and method for the formation of a spheromak plasma.

Devices employed for the containment of plasmas by magnetic fields may have various configurations. Two well-known types of such devices are the open-ended type, such as the magnetic mirror type, and the toroidal type, such as the tokamak. The underlying principle of all types of such containment devices is the containing of a hot, dense gas away from physical walls for a time sufficient to allow fusion reactions to take place.

An advantage of the mirror-type device is that it has have a coil-blanket topology which does not link the plasma. However, the mirror-type open ended apparatus has a disadvantage in that the trapped charge particles may escape while travelling along the magnetic field lines which define their spiral orbits. The magnetic field lines do not close upon themselves inside the magnetic mirror, thus compounding the problem of large plasma losses through the mirror ends. It occurred to many people in the early days of fusion research that mirror end losses could be easily eliminated simply by bringing the two ends of the straight cylinder on themselves, thus forming the well-known torus device.

The toroidal-type devices have an advantage in that plasma is well confined in the closed magnetic field lines. Since the ions tend to remain in a spiral orbit about a given set of magnetic field lines, the continuity of the magnetic field lines inside the apparatus enhances containment. A tokamak has clearly this above mentioned advantage but suffers from a difficult topology in which the coil-blanket links the toroidal plasma.

The spheromak combines the most advantageous aspects of the above-discussed toroidal and mirror schemes. The spheromak is characterized by magnetic field lines which are closed, as in a tokamak, and by a coil-blanket topology which does not link the plasma, as in a mirror-type device.

Among the advantages of this spheromak formation scheme is the ability to keep the physical structure of the apparatus away from the plasma, thus reducing absorbed impurities and keeping the plasma "hot". Also, the spheroidal blanket simplifies the design and construction of the reactor apparatus. The magnetic field configuration of the spheromak includes both toroidal and poloidal components, but the toroidal component is maintained entirely by plasma currents, and, therefore, it vanishes outside the plasma. The outward pressure of the toroidal field and of the plasma is balanced by the inward pressure of a poloidal field.

For additional background discussions relating to the spheromak configuration, the reader is referred to S-1 Spheromak, Princeton University, Plasma Physics Laboratory, Aug. 24, 1979, the disclosure of which is hereby incorporated by reference.

Configurations of the spheromak type were first studied theoretically in an astrophysical context by Lust et al (*Z. Astrophysics* 34 (1954) 263) and Chandrasekhar (*Proceedings of the National Academy of Sciences* 42 (1956) 1). More recently, an experimental investigation of the spheromak in the fusion context was carried out by Alfven (*Proceedings of the Second International Conference on Peaceful Uses of Atomic Energy* 31 (1958) 3).

Extensive MHD equilibrium analyses have been carried out upon spheromak and spheromak-like configurations by Morikawa in *Physics of Fluids* 12 (1969) 1648; 13 (1970) 497; and 16 (1973) 140. However, each of the above references was primarily directed to the theoretical aspects of spheromaks, and was not concerned with how one would go about forming such a configuration.

More recently, Bussac et al (*Plasma Physics and Controlled Nuclear Fusion Research*, Seventh International Conference, Innsbruck, 1978) discussed the advantage of a spheromak configuration for use in a fusion reactor. Bussac, in a theoretical context, discusses the basic parameters for both large and small spheromak reactors, but only alludes to the fundamental problem of how such a spheromak configuration is to be formed, citing the heretofore known techniques discussed below.

Two known methods of spheromak plasma formation suitable for spheromak start-up have been experimentally confirmed. The first of these is the so-called "Marshall gun" approach, which is discussed in Alfven, *Proceedings of the Second International Conference on Peaceful Uses of Atomic Energy* 31 (1958). This approach is characterized by the establishment of an initial poloidal field, followed by the application of toroidal flux through an electrode system. Plasma inertia is relied upon to immobilize the toroidal flux while the poloidal field lines are reconnected within the plasma. This approach has the disadvantage of requiring formation on a dynamic time scale, leading to questions of whether the internal poloidal flux is adequately reconnected. Also, since an electrode system is used, this formation scheme may suffer from problems of erosion and impurity influx, causing plasma cooling problems.

Another known scheme suitable for spheromak startup is the familiar reversed-field theta-pinch approach, as discussed in *Centre de Recherches en Physique des Plasmas*, Lausanne, Switzerland (1978-79). This scheme is quite similar to the Marshall-gun approach, and thus suffers from the same disabilities. The major difference between the two approaches is that the geometry of the plasma forming structure is rotated by 90° relative to that of the Marshall-gun approach, thus producing radial, rather than axial, plasma acceleration.

SUMMARY OF THE INVENTION

The present invention provides an improved method and apparatus for inductively forming a detached spheromak plasma configuration wherein the plasma may be contained at a substantial distance away from physical walls. The present invention is useful for forming a hot plasma, and for generating possibly large quantities of X-rays and neutrons. The invention can be used in numerous instances where neutrons are needed, as for example in the formation of medical isotopes.

Accordingly, one object of the invention is to provide an improved apparatus for plasma formation and confinement, the apparatus comprising a toroidally-shaped ring core having a radially interior major radius side and a radially exterior major radius side which includes both poloidal and toroidal magnetic field generating coils; a generally spheroidal vacuum vessel for enclosing the ring core; a pair of external equilibrium field coils for supporting the detached plasma; and a means for pinching off or severing a portion of the plasma and for causing poloidal magnetic field line reconnection, such that the detached plasma may be contained at a distance from physical structure.

Another object of this invention is to provide such an apparatus with a pair of pinching coils which are operable to cause the severing of a part of the plasma.

A main object of this invention is to provide an improved method for forming such a detached plasma, the method comprising energizing a pair of external coils to produce a first poloidal magnetic field; energizing the poloidal coil of the ring core to produce a second poloidal magnetic field, thereby to produce a composite poloidal field which is stronger on the radially exterior major radius side of the ring core than on the radially interior major radius side; energizing the toroidal coil of the ring core to initiate a plasma discharge and to emit toroidal flux which becomes trapped in, and expands, the poloidal flux, such that the plasma expands toward the radially interior major radius side of the ring core, and; pinching off a portion of the distended plasma with a pinching means so as to produce a detached spheromak plasma.

Other objects and advantages of the invention will become clear from the following drawings and detailed description of the invention.

BRIEF DESCRIPTION OF THE DRAWINGS

FIG. 2b is a plot of the relative magnetic field strengths within the configuration of FIG. 2a;

FIGS. 7a and 7b illustrate quasi-static formation methods using electrodes;

FIG. 10 is a cross-sectional view of the ring core of FIG. 9;

FIG. 11 is a cross-sectional view of a pinch coil;

FIG. 12 is a cross-sectional view of an equilibrium field coil;

FIGS. 13, 15, 16 and 17 are schematic diagrams of the power supply circuitry for the poloidal, toroidal, pinch and equilibrium field coils, respectively;

FIG. 18 illustrates constructional details of the ring core;

DETAILED DESCRIPTION OF THE PREFERRED EMBODIMENTS

The Spheromak Plasma Configuration

The spheromak plasma configuration is characterized by magnetic field lines that are closed, as in a tokamak, and by a coil blanket topology that does not link the plasma—as in a mirror-type machine. The configuration is described in detail in M. N. Bussac, H. P. Furth, M. Okabayashi, M. N. Rosenbluth, and A. M. Todd, *Plasma Physics and Controlled Nuclear Fusion Research* (Proc. 7th Int. Conf., Innsbruck, 1978) Vol III (paper IAEA-CN-37-X-1); M. N. Rosenbluth and M. N. Bussac, *Nuclear Fusion* 19 (1979) 489; and M. Okabayashi and A. M. Todd, PPPL-1580 (August 1979), submitted to *Nuclear Fusion*. The reader is referred to these articles for a more detailed theoretical discussion. The configuration is depicted in simplified form in FIG. 3. The spheromak configuration has a number of advantages: (1) The spheroidal blanket simplifies design, construction, and upkeep; (2) Since the maximum field strength at the external coils is lower than at the plasma center, rather than higher as in a tokamak, the "engineering beta value" (see below) is substantially greater than in a tokamak; (3) The plasma is located within a natural divertor system.

Figure 2A:
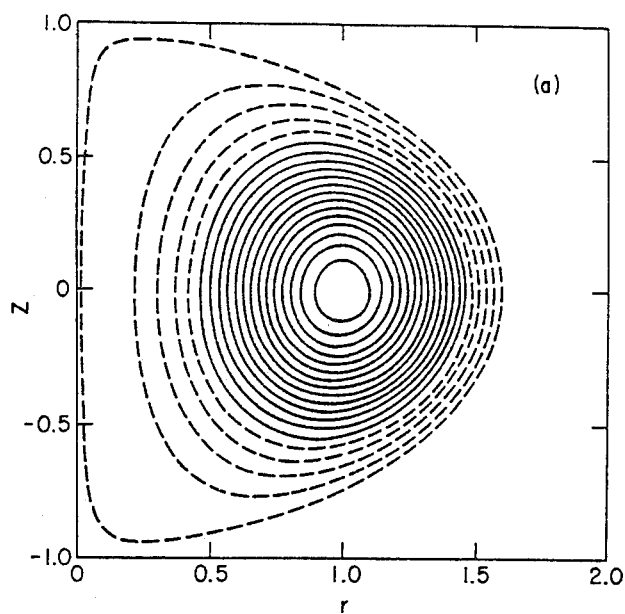
FIG. 2a is a cross-sectional view of a spheromak plasma.

The magnetic field configuration of the spheromak is shown in FIG. 2a and includes both toroidal and poloidal components, but the toroidal component is maintained entirely by plasma currents and, therefore, vanishes outside the plasma. The outward pressure of the plasma is balanced by inward poloidal field pressure.

Figure 2B:
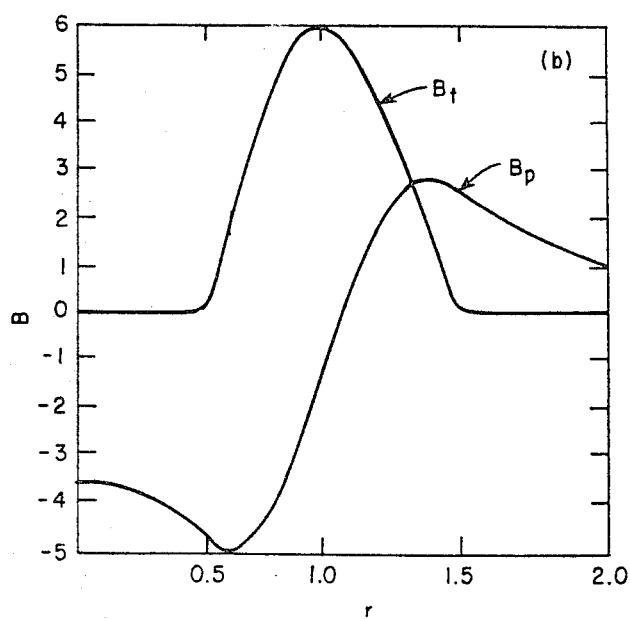

As shown in this FIG. 2b, the maximum field strength $B_o$ at the plasma center is typically several times greater than the field strength $B_e$ at the plasma edge, which must be supported by the poloidal-field coils. Even for a central beta value $\beta_o^* = 2\mu (<p^2>)^{1/2}/B_o^2$ as low as 2%, the engineering beta value $\beta_e^* = 2\mu (<p^2>)^{1/2}/B_e^2$ is thus about 15%. (This contrasts with the tokamak case, where even an optimistic value $\beta_e^* = 8\%$ would imply only $\beta_e^* = 2\%$.)

For the analytical treatment of MHD equilibrium and stability in the low-$\beta$ limit, it is particularly convenient to specify the relationship J=kB with the scalar function k simply constant. In spherical geometry, this model gives the idealized spheromak configuration of FIG. 3. This representation of the spheromak is, of course, unrealistic, because k must go smoothly to zero at the edge of any real plasma; however, the model gives some fundamental insight into the theory of gross stability.

Equilibrium configurations of the spheromak type were first studied many years ago in the field of astrophysics (see, for example, Lust and Schluter, *Z. Astrophys* 34 (1954) 263; S. Chandrasekhar, *Proc. Nat. Acad. Sci.* 42 (1956) 1.). At that time, the analytical model of FIG. 3 was pointed out. A review of subsequent publications, some of them in the fusion context, is given in the Bussac et al reference noted above.

Operating Parameters of the Spheromak Configuration

(a) Stability and Geometry

Figure 3:
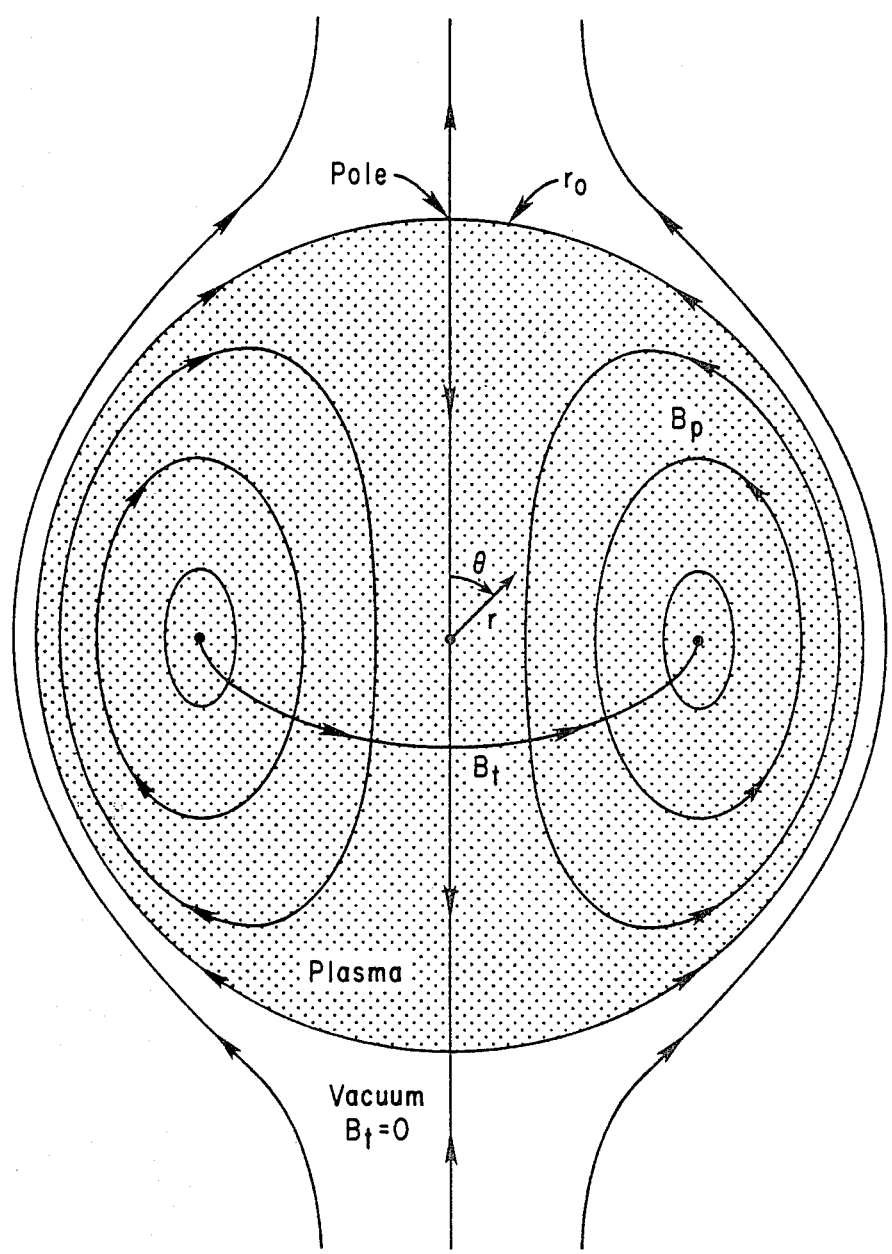
FIG. 3 is an illustration of an idealized classical spheromak configuration.

The global instability modes of the spheromak are conveniently described by applying Taylor's method to the idealized configuration of FIG. 3 (see the Rosenbluth et al reference noted above for particulars). In this way, the low-aspect-ratio limit can be treated rigorously, and both ideal and resistive modes are uncovered.

The axisymmetric (n=0) modes are all found to be stable unless the externally applied field is concave (decreasing towards the axis) so that the spheromak plasma becomes prolate, in which case it is unstable against rigid vertical displacement—just like a tokamak plasma. This mode is easily stabilized by a loose-fitting conducting shell, or by making the plasma oblate. Alternatively, a rigid sideways displacement (n=1) can be unstable if the external field is convex, so that the plasma is oblate, but again this mode is easily stabilized by a conducting shell. If oblateness is measured by $a/b = 1+\epsilon$ (where a is the horizontal radius and b the half-height of the speroid), then the required proximity of the conducting shell (radius $r_s$) to the plasma (radius $r_c \sim a \sim b$) is given by $r_s < r_c (1+1/\epsilon)$. For moderately small $\epsilon$, this is an extremely lenient condition. Both axial and radial displacements of the spheromak plasma are therefore relatively harmless. In the present configuration the vacuum vessel has been found to be sufficient to insure plasma centering. A system of passive stabilizing conductors could easily be introduced, if desired, to aid in this function.

A moderately dangerous mode appears to be the tilting of the plasma (n=1). In any perfectly spherical case, this mode is evidently marginally stable. Surprisingly, a prolate plasma is unstable against tilting, even within a tight-fitting shell ($r_s = r_c$). this can be shown to be an ideal-MHD mode where the plasma tilts in a nonrigid manner, while its surface remains fixed. Oblate plasmas, such as that used in the present configuration, are stable against tilting, provided there is a shell at $r_s < r_c (1+0.2\epsilon)$. This requirement on the conducting shell proximity would typically be quite stringent, but is mitigated by several factors. Spheromak configurations with central flux holes, such as the one in FIG. 2 produced by the present device, do not tilt as readily as simple spheroids. Furthermore, even highly prolate spheromaks (theoretically the most unstable case) have not as yet been observed to tilt in actual experiments. (see G. C. Goldenbaum et al. *U. Md. Report* pp. 80-001 (July 1979)). At the present time, therefore, no special tilt-stabilizing feature has been incorporated into the present design. In the event that the ongoing spheromak experiments should begin to encounter a real problem of tilt stability, an appropriate system of passive (or even active) stabilizing conductors can be added on the interior of the vacuum chamber.

An encouraging result of the Taylor analysis has been that there is no unstable interior n=1 mode in the spheromak—as there would be in the case of a tokamak with q<1. In the spheromak, the situation is just the reverse: an interior n=1 kink would be expected to appear only when q exceeds unity.

The first really dangerous mode for the spheromak appears to be the n=2 mode. In Taylor's analysis, an n=2 mode can appear only if a vacuum region is introduced outside the plasma. The stability condition then becomes $r_s < 1.15 r_c$. Such a close-fitting shell may be provided in the present configuration, if necessary, since the plasma-formation technique disclosed herein would lend itself to inserting the final plasma within a rigid conductor system and "inflating" it with interior toroidal flux so as to achieve the desired degree of proximity of the plasma surface to the conductors. From the point of view of minimizing plasma-wall interaction and maximizing direct line access to the plasma, such a requirement would, however, be disadvantageous.

In summary, the question of spheromak stability is essentially a question of conducting-shell proximity. The lowest-order modes are harmless, since they can be stabilized by distant shells. The highest-order modes are harmless, for plasma-physical reasons. The severity of the intermediate modes depends on plasma conditions, as well as on geometry.

Theoretical studies (Okabayashi et al noted above) indicated that optimal finite-$\beta$ stability is achieved in a spheromak that is somewhat oblate and has an appreciable "flux hole" around the axis of symmetry. Conducting-wall stabilization also takes place more easily with large-hole devices. Beta-values close to maximum are achieved for a toroidally shaped plasma of aspect ratio $R/a \simeq 2$, as in FIG. 2.

The significance of a central "flux hole" in practical experimental terms is that an outer flux region is maintained free of plasma current, so that the shear at the edge of the current-carrying region becomes large. Various options for realizing this situation are available, including appropriate initial field-programming, edge-cooling, and shaping of the "divertor flux."

Using an apparatus and method according to the invention disclosed herein, a shell-free spheromak plasma, located well away from the device walls and interior coils was formed, and this plasma, having an aspect ratio of $R/a \simeq 2$ was found to be stable against low-order modes, thus confirming the theoretical studies noted above. In the event that gross modes are later seen, the minimum necessary system of stabilizing loops will be installed. The objective is to assure adequate MHD stability while maintaining maximum effective wall spacing relative to the plasma.

(b) Plasma Size and Density

The range of appropriate plasma size and density is determined basically by the MHD $\beta$-limit and by the limit on the electron streaming velocity $v_{stream}$. The typical $\beta$-requirement is $$\beta_o^* = \frac{2\mu <p^2>^{\frac{1}{2}}}{B_o^2} \lesssim 0.02. \tag{1}$$

After assuring that MHD stability can be achieved at this $\beta$-level, it will be important, next, to avoid microinstabilities. For this purpose, the electron drift velocity associated with the strong internal currents of the magnetic field configuration has to be well below the electron thermal velocity. At a minimum, we require $$\frac{v_{stream}}{v_{thermal}} < 0.03 \tag{2}$$

The conservative limit 0.03 was chosen by examining data from various toroidal pinch experiments and noting that the onset of plasma anomalies very generally tends to occur at this level. Combining the conditions on $\beta$ and $v_{stream}$ with the large-flux-hole condition (R/a=2), we obtain $$\frac{v_{stream}}{v_{thermal}} = \left( \frac{3 \cdot 10^{11} \text{ cm}^{-1}}{\beta_o^* n_c a^2} \right)^{\frac{1}{4}} < 0.03. \quad (2a)$$

Figure 4:
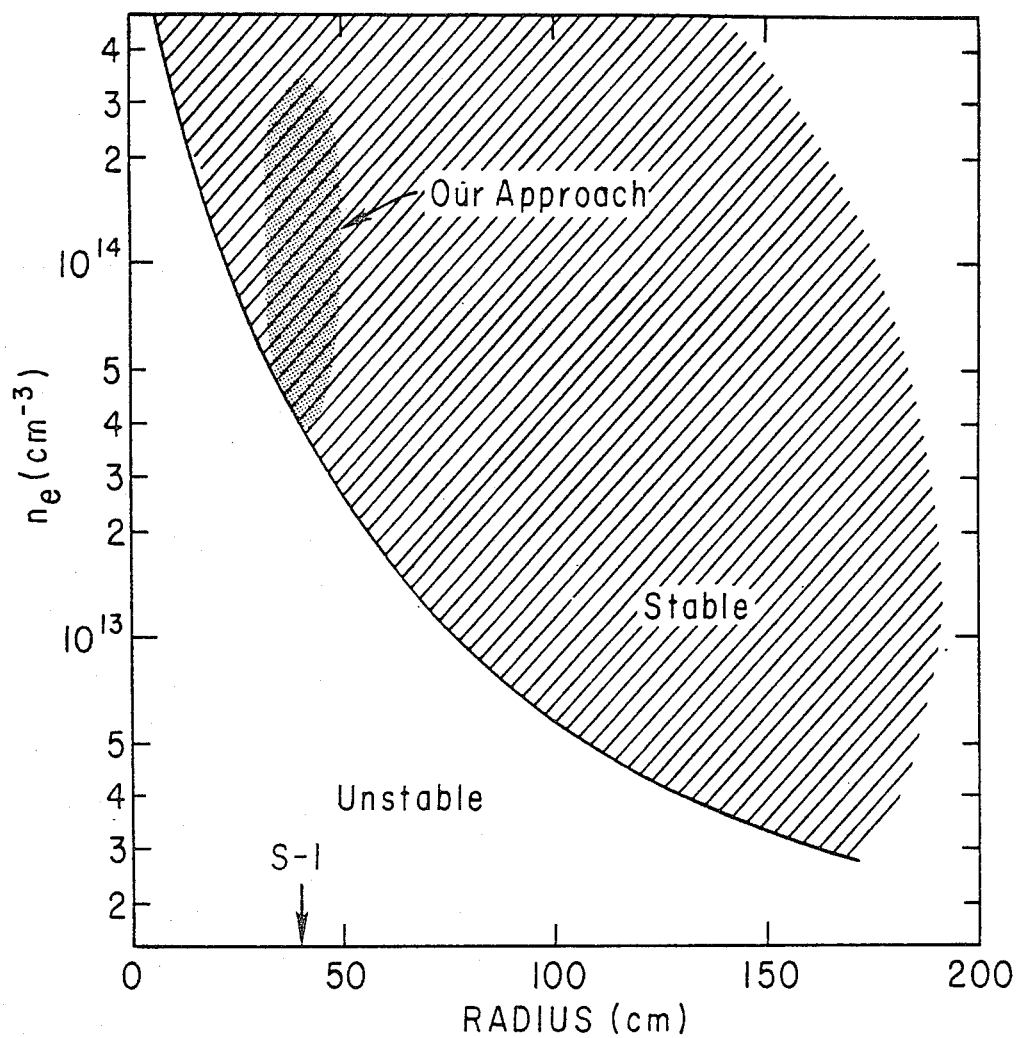
FIG. 4 is a graphical representation of the size and density ranges of the plasma for avoiding MHD flutes and current driven microinstabilities.

Since $\beta_o^* < < 1$, this condition is correspondingly difficult to satisfy. The parameter region that is stable from the point of view of Eq. 2a as shown in FIG. 4 for the case $\beta_o^* = 2\%$. This figure shows that in a spheromak plasma with a major radius R of about 40 cm (minor radius a $\sim$20 cm) and a density $n_c > 5.10^{13}$ cm$^{-3}$, one can operate without generating gross MHD or current-driven microinstabilities, provided the beta limit is reached. (At lower operating betas, the density must be correspondingly higher.)

Figure 5:
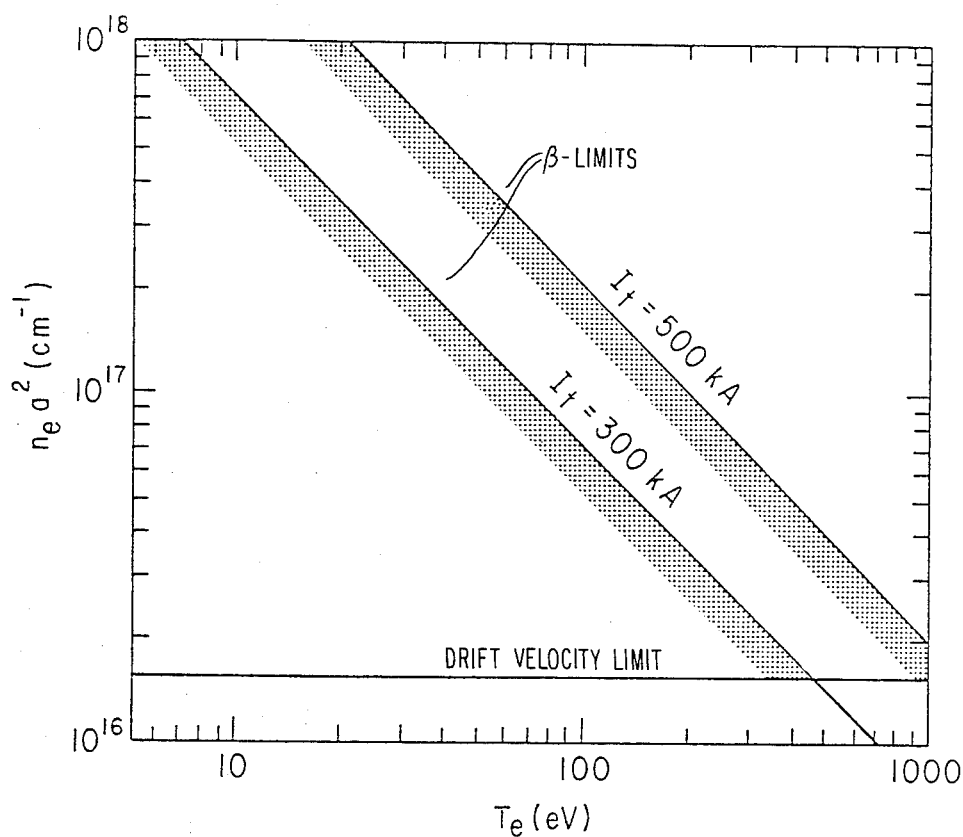
FIG. 5 is a graphical representation of the operating regime for a spheromak plasma with B=2%.

These considerations are made quantitative in FIG. 5, which illustrates the size of the "stable region" between the conditions of Eq. 2 and 2a as a function of electron temperature, for a spheromak of $\beta_o^* = 2\%$ and several values of toroidal current. In the desirable temperature range $T_e > 100$ eV, a 500-kA current provides an appreciable operating margin.

The upper end of the permissible range of currents is, of course, fixed by economic consideration. Magnetic energy storage scales as $W_\mu \alpha I^2 a$; magnet power dissipation scales as $P_M \alpha I^2/a$. Practical experience has shown that the cost of achieving a given current may be reduced somewhat in small size and at high fields, but the size-dependence is not pronounced. The operating field strength was chosen at a modest level of approximately 1 Tesla.

The condition that the total fast-pulsed magnetic-field energy in the present system should not be greater than about one MJ, led to the spheromak plasma parameters R$\sim$40 cm, a$\sim$20 cm, I$\sim$500 kA.

With the spheromak plasma size established at R$\sim$40 cm, the appropriate plasma density range follows and has been indicated in FIG. 4.

Formation of the Spheromak Plasma

In this section, a brief overview of various formation methods will be given, and will be briefly compared with the formation process contemplated by the present invention, which will be described in more detail hereafter.

"Dynamic formation" means that the formation process proceeds very rapidly, on the order of a few microseconds or less. By "quasi-static", it is meant that the formation process proceeds more slowly, typically ten to fifty microseconds (hundreds of Alfven transit times).

The scarcity of experimental work on spheromak-type configurations is due primarily to the difficulty of forming and maintaining the plasma. Since there are no toroidal field coils to maintain the plasma toroidal field, an internal poloidal current must be made to circulate within the plasma, so as to support the desired toroidal flux. In terms of conventional technology, this means that in the formation process a poloidal current must be passed along poloidal flux surfaces that are initially open and are then closed by magnetic reconnection, once the interior toroidal flux is established.

Two methods of dynamic spheromak plasma formation that have already proved experimentally successful are shown in FIG. 6: the Marshall-gun approach (a and b) and the reversed-field theta pinch approach (c and d). The details of these two approaches are discussed in Alfven, *Proc 2nd Int. Conf on Peaceful Uses of Atomic Energy* 31 (1958) 3; and *Centre de Recherches en Physique des Plasmas*, Lausanne, Switzerland (1978–79), respectively. The geometries of these two types of plasma-forming structures are rotated by 90° relative to one another: The Marshall-gun produces axial plasma acceleration, while the theta-pinch produces radial acceleration. Otherwise, the methods are fairly similar. Both approaches establish an initial poloidal field, then apply toroidal flux through an electrode system, and finally rely on plasma inertia to immobilize the toroidal flux while the poloidal field lines are reconnected so as to close around the plasma. These operations must be performed on a dynamic time scale (typically a few microseconds or less in present-day experiments).

A number of hot-plasma experiments have already demonstrated quasi-static reconnection of magnetic field lines: (See Fisher et al *Phys Rev. Lett.* 39 (1977) 622 and Prater et al *Phys. Rev. Lett.* 34 (1975) 1432.)

Figure 6A:
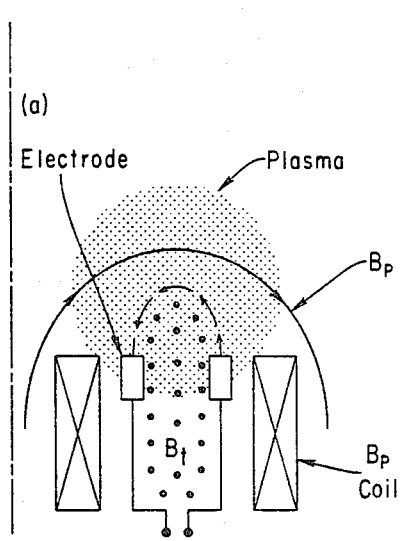
FIGS. 6a–6d depict alternative dynamic formation methods.
Figure 6B:
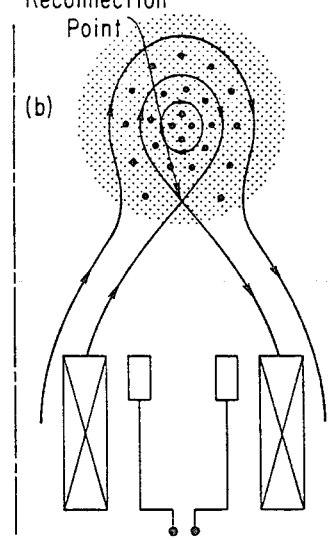
Figure 6C:
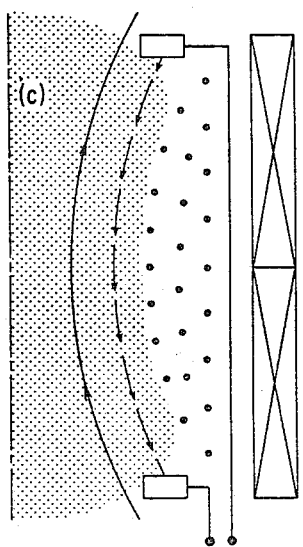
Figure 6D:
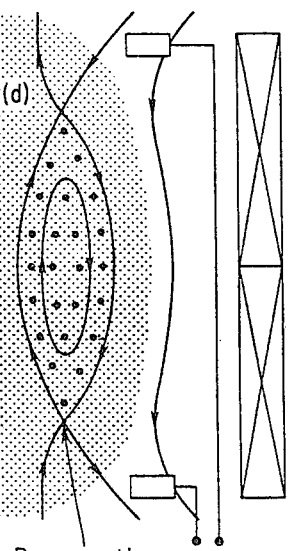

A simple illustration of a quasi-static approach (FIG. 7) has been developed by the inventors from the theta-pinch method of FIG. 6c and 6d. During the first phase of the formation process, a toroidal field is generated by a current flowing between the electrodes; its pressure stretches the poloidal magnetic field lines towards the major axis (FIG. 7a). In the second phase (FIG. 7b) the "pinch coils" are energized and gradually force a reconnection of poloidal field lines at a singular point within the plasma, thus forming a separate spheromak configuration. After the vertical magnetic field due to the pinch coils has reached sufficient amplitude to hold the spheromak plasma in place, the currents in the initial poloidal-field-generating coil and in the toroidal-field-generating electrodes can be turned off altogether.

The formation method of FIG. 7 is quasi-static, but suffers from a technical requirement that seems poorly suited to large scale operation, namely, the necessity to pass the toroidal field-generating current between electrodes, which may ultimately lead to serious problems of erosion and impurity influx. (For further discussion, see Aitken et al *Nuclear Fusion* 5 (1965) 30.) In order to eliminate this type of difficulty, the scheme of FIG. 7 has been replaced by the more advantageous scheme of FIG. 8 where magnetic induction of the toroidal-field-generating current is substituted for passage of current through the electrode system. This is one formation method that has been developed for the present device, as discussed more fully hereinafter.

Figure 8A:
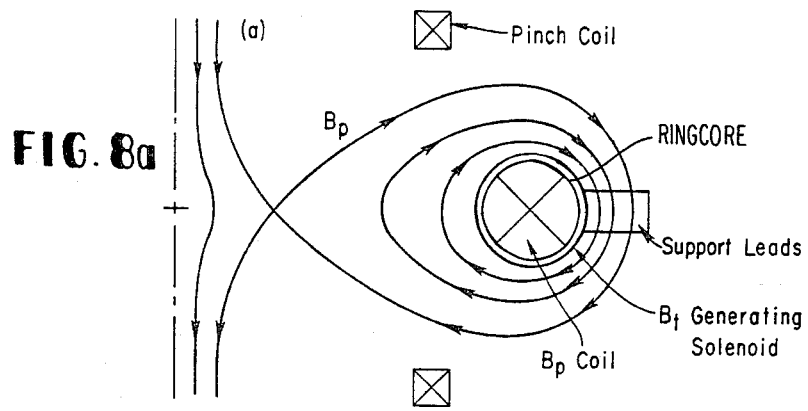
FIGS. 8a–8c illustrate a method of quasi-static formation utilizing induction.
Figure 8B:
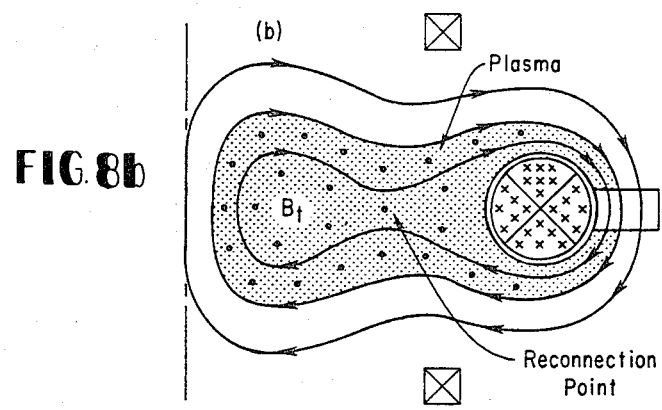
Figure 8C:
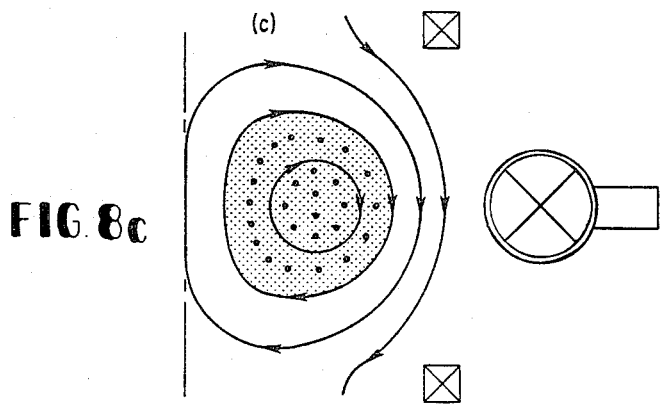

In the inductive formation scheme of FIG. 8, an initial poloidal field is generated by a winding inside a O ring-shaped shell. The initial poloidal field is weakened on the small-major-radius side of this ring by superposition of an external vertical field (not shown). The ring also contains a toroidal solenoid which is able to generate an interior toroidal flux and is, therefore, able to emit an equal and opposite toroidal flux on its exterior. When the toroidal solenoid is energized, it induces a poloidal current in a sleeve-shaped plasma surrounding the ring. The associated toroidal field distends the poloidal-field sleeve, stretching it in the direction towards the axis, where the poloidal field is weakest. Next the pinch coils are energized, producing a separated spheromak plasma configuration, and the electric currents inside the ring can then be allowed to decay, while the spheromak configuration remains.

Since the flux-generating ring in FIG. 8 must be supported mechanically and energized by exterior circuits, this configuration is not yet perfectly free from heatconduction losses along field lines and the associated impurity evolution problems. Even in a small-sized device, such as the present device, however, the "opacity" due to the ring leads is only about 5%. In larger devices, the opacity will decrease further, and it will become practical to introduce magnetic guarding to protect the leads.

Details of Construction

Figure 1:
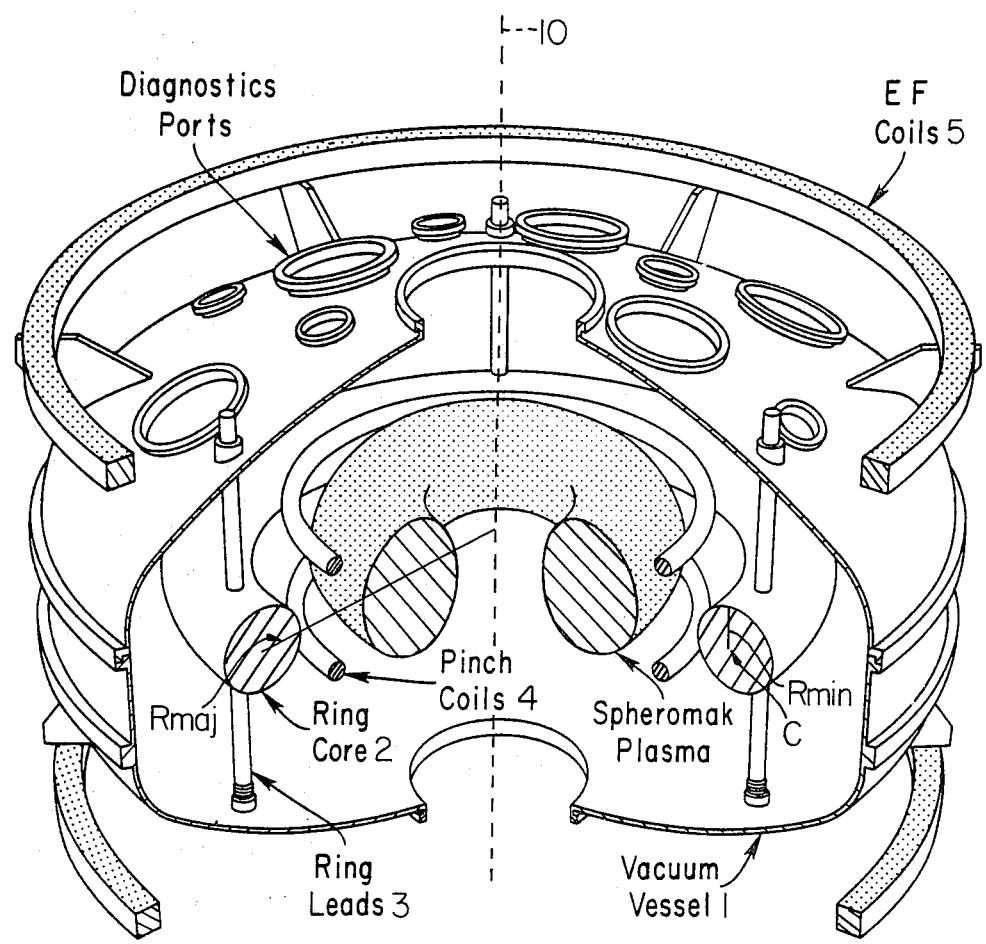
FIG. 1 is a cutaway view of a spheromak plasma formation apparatus according to the present invention.

Referring now to FIG. 1 which illustrates the preferred form of the device of the present invention in more detail in a cutaway view, a generally spheroidal vacuum vessel 1 having a major axis or axis of symmetry 10 houses a flux ring 2 of toroidal shape and supported within the vessel by means of ring leads 3. The flux ring or ring core 2 has a major radius Rmaj and a minor radius Rmin as indicated in the drawing. The plane of symmetry of the ring core 2 is perpendicular to the axis 10 and extends through the center C of the ring.

Pinch coils (PN) 4, whose function has been discussed previously, are positioned radially inwardly of the ring core 2 and are spaced equidistantly above and below the plane of symmetry of the core. Equilibrium field coils 5 are positioned exteriorily of the vacuum vessel 1 and radially outwardly of the ring core 2. As was the case with the pinch coils 4, the equilibrium field coils are spaced equidistantly above and below the ring core 2.

Figure 9:
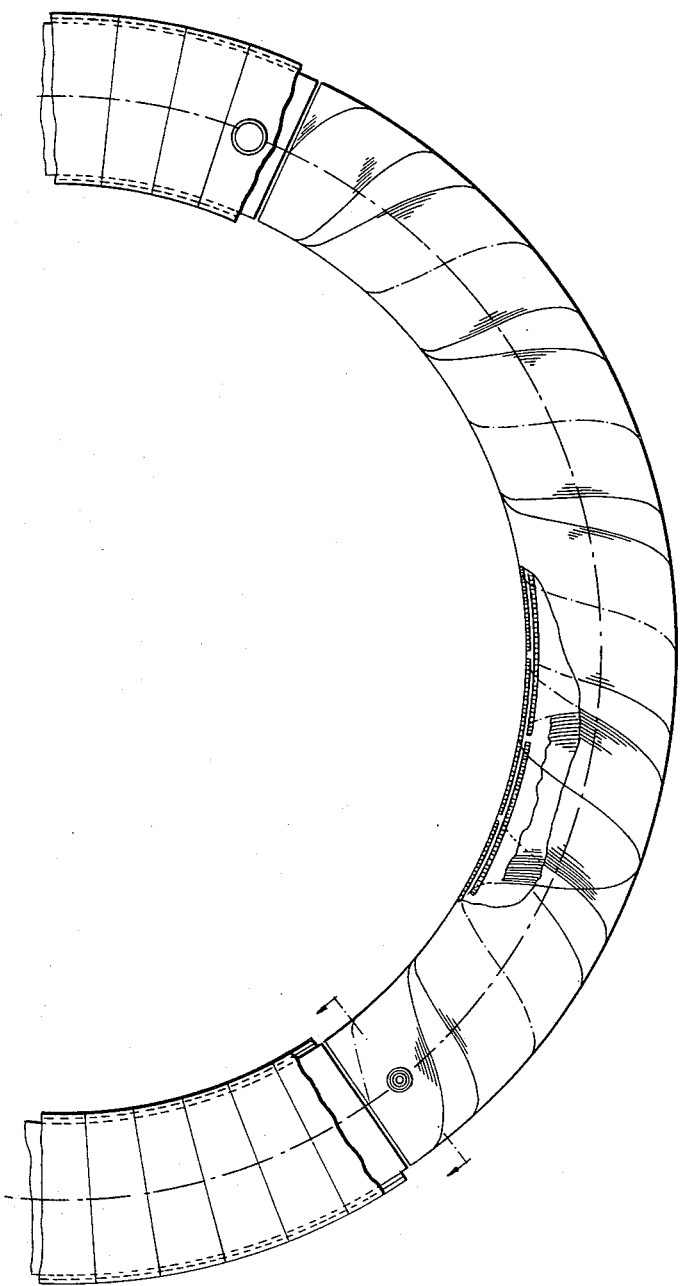
FIG. 9 is a top view, partially cutaway, of the ring core of the present invention.

The basic purpose of the ring core 2 is to house the poloidal flux coil (PC coil) and the toroidal flux coil (TC coil), and to protect both of these coils from the plasma. The major radius of the ring core 2 is on the order of one meter, and the minor radius is approximately 15 centimeters. A top cutaway view and a cross-sectional view of the ring core appear in FIGS. 9 and 10, respectively, where the coils making up the PC and TC are illustrated.

As seen in FIG. 1, there are six vertical supports 3 for the ring core 2, which also act as electrical leads for the coils. The three supports that extend from the top of the ring core 2 are spaced at 120° intervals and house the leads for the toroidal flux coil. The three lower supports are colinear with the upper supports and house the electrical leads for the poloidal flux coil.

The poloidal flux coil is divided into three primary sections. Each section consists of one turn and traverses 360° of the major circumference of the ring core 2. The three sections of the poloidal flux coil are spaced at 120° intervals along the minor circumference of the ring core. As previously noted, each of the bottom support tubes contains an electrical lead for this coil.

Each turn of the poloidal flux coil is made from a ⅜ inch thick copper sheeting which is made from a spinning. A pair of hollow square copper tubes may be soldered onto these sheets to provide for long-term heat extraction. The temperature rise per pulse in these coils is less 1° C. The parameters of the coil are summarized in Table 1 for convenience.

TABLE 1

| POLOIDAL FLUX COIL PARAMETERS | |
| --- | --- |
| Major Radius | 1.0 Meter |
| Inner Minor Radius | 0.093 Meter |
| Outer Minor Radius | 0.102 Meter |
| Turns | 3 |
| Inductance | 27.16 Micro-Henry |
| D.C. Resistance | 168.4 Micro-Ohm |
| A.C. Resistance (2.5 KHZ) | 1.21 Milli-Ohm |
| Total NI | 545 Kilo-Ampere |

TABLE 1-continued

| POLOIDAL FLUX COIL PARAMETERS | |
| --- | --- |
| I | 182 Kilo-Ampere |
| $\frac{1}{2}LI^2$ | 450 Kilo-Joule |

The coil that produces the toroidal flux is also divided into three sections, each section occupying 120° of the major circumference of the flux ring. Each section consists of an electrical lead and two-coarse pitch helical coils wound over each other: one right hand and one left hand. The circuit of one of the three major sections is as follows: Current enters the lead 3, flows in the outer helix in a right-hand manner, makes six turns while traversing 120° of the flux ring major circumference, and terminates in a support. Current flows from the support into the inner helix and back six turns in a left hand manner to the area of the lead stem where it exits from the coil, co-axially with the entering current lead. This results in $2 \times 6 = 12$ turns per section for three sections, thus giving thirty-six turns for the toroidal flux coil.

The conductor for the toroidal flux coil is made from eighty parallel copper conductors. Each conductor is $\frac{1}{4} \times \frac{1}{4}$ inches in cross-section and is varnish insulated. The temperature rise during a pulse is less than 1° C. The center conductor of each wrap is ¼ inch square hollow conductor to provide water cooling for long term heat extraction. The choice of multiple filament parallel conductors for the TC coil is dictated by ease of manufacture, as the wrapping of a more conventional single sheet into a coarse toroidal helix would involve compound bending of the conductor, and thus would be difficult and expensive.

TC and PC coils are mounted within a ring core 2 ceramic shell (which will be subsequently described) and are supported by a monolithic matrix of fiberglass and epoxy, which also acts as electrical insulation. The matrix is made by several repetitive impregnating and curing steps, using either one mold with filler blocks or the multiple molds, whichever is more cost effective.

First, a fiberglass torus is fabricated, and the poloidal flux coil turns are mounted on this torus and are held in place with armature banding tape. Then, this structure is wound with a overwrap of dry fiberglass of a thickness corresponding to a inner radius of the first layer of the toroidal flux coil. The dry fiberglass is overwrapped with mold release tape and then vacuum impregnated and cured. The TC coil is then wound with prefabricated guide and filler blocks mounted on the assembly. Each layer is held in place with armature banding tape. A separate impregnation is required for each layer of the TC coil. Finally, the assembly is mounted in a ceramic shell and a final vacuum impregnation is used to secure the coil in place. The parameters of the toroidal flux coil are conveniently summarized below in Table 2.

TABLE 2

| TOROIDAL FLUX COIL PARAMETERS | |
| --- | --- |
| Major Radius | 1.0 Meter |
| Inner Layer | |
| Inner Minor Radius | 0.109 Meter |
| Outer Minor Radius | 0.115 Meter |
| Outer Layer | |
| Inner Minor Radius | 0.121 Meter |
| Outer Minor Radius | 0.128 Meter |
| Turns | 36 |
| Inductance | 11.38 Micro-Henry |

TABLE 2-continued
TOROIDAL FLUX COIL PARAMETERS

| | |
|---|---|
| D.C. Resistance | 308.57 Micro-Ohm |
| A.C. Resistance (5 KHZ) | 2.07 Milli-Ohm |
| Total NI | 11.39 Kilo-Ampere |
| I | 316.4 Kilo-Ampere |
| ½LI² | 570 Kilo-Joule |

As previously noted, there are provided six electrical lead/mechanical support tubes affixed to the ring core 2. Three supports exit from the top of the ring core assembly and three exit from the bottom. The support areas are spaced 120° apart on the major circumference of the ring core 2 with the top and bottom supports colinear. The upper supports contain the electrical leads for the toroidal flux coil and the lower supports contain the leads for the poloidal flux coil. The electrical leads are coaxial within each support and are housed in a ceramic tube. The entire flux core is covered by a 0.003 inch thick Inconel liner which not only protects the core surface from plasma sputtering and erosion but also would partially smooth an induced field at the initial break-down stage.

The pinching coil (CPN) system consists of two one-turn coils located in the vacuum vessel at a radius from the central axis of 0.7 meters, and at a vertical distance from the central plane of the flux ring assembly of plus or minus 0.2 meters. To permit two capacitor banks to be interleaved in each of the one-turn coils, the coils are made of two 180° arc segments with leads at the beginning and end of each segment. The coil is manufactured from solid extruded copper rod rolled to form the arc segments. As seen in FIG. 11, a split ceramic shell surrounds each of the pinching coils. The parameters of the pinching coils are conveniently summarized in Table 3 below.

TABLE 3
PINCHING COIL PARAMETERS

| | |
|---|---|
| Major Radius | 0.7 Meter |
| Distance Off Midplane | ±0.2 Meter |
| Outer Minor Radius | 0.0254 Meter |
| Turns/Coil | 1 |
| Inductance (Both Coils) | 7.57 Micro-Henry |
| D.C. Resistance | 74.7 Micro-Ohm |
| A.C. Resistance (10 KHZ) | 1.436 Milli-Ohm |
| ½Li² | 265.8 Kilo-Joule |
| I | 265 |

The equilibrium field system as seen in FIGS. 1 and 12 consists of two conventional water-cooled copper coils located outside the vacuum vessel. These coils are powered in a series arrangement by a generator. The design and fabrication of these coils is similar to the poloidal field coils. The conductor is extruded copper with a rectangular cross-section and a centrally located round coolant hole. Each conductor is wrapped with three layers of 0.00325" Mylar tape, as the primary turn-to-turn electrical insulation. Two layers of 0.0005" B-stage, epoxy-glass tape are applied over the Mylar to bond the turns together. Three layers of 0.020" B-stage, epoxy-glass tape are toroidally applied over the completed winding to serve both as insulation between the coil and ground, and to mechanically reinforce the the assembly. Pressure is applied to the B-stage epoxy-glass by shrinkable Mylar during the elevated-temperature curing cycle. For convenience, the parameters of the equilibrium field coils are summarized in Table 4.

TABLE 4
EQUILIBRIUM FIELD COIL PARAMETERS

| | |
|---|---|
| Radius | 1.5 Meter |
| Distance Off Midplane | ±0.825 Meter |
| Cross Section | 0.1 × 0.1 Meter |
| Turns/Coil | 20 |
| Inductance | 5.93 Micro-Henry |
| D.C. Resistance | 18.6 Micro-Ohm |
| NI/Coil | 400 Kilo-Ampere |
| I | 20 Kilo-Ampere |
| Field at R = 0.4 Meter | 0.22 Tesla |
| ½LI² | 1.19 Mega-Joule |
| I²R | 7.44 Mega-Watt |

Figure 13:
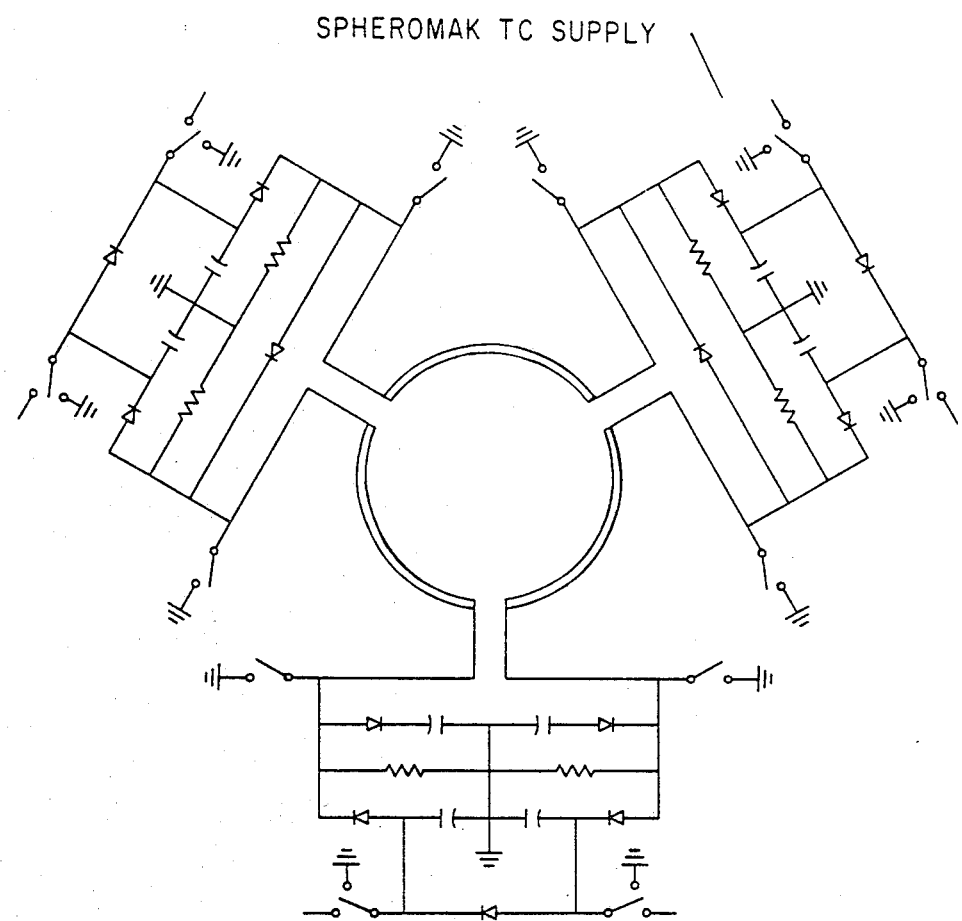

Turning now to the energy system provided for the formation coils, FIG. 13 depicts the power supply for the PC coil. It consists of three identical supplies each connected to a full turn of the PC coil. The power supply consists of a capacitor bank with its charge and discharge circuits, the parameters of the capacitor bank being given in Table 5. To minimize the line to ground voltage, the midpoint of each power supply is grounded. The triggered switching devices are conservatively designed, so that they can block full reverse voltage after a half cycle discharge. Some resistance can be added if necessary to lessen the reversed voltage. A crowbar circuit is included to terminate the discharge, if desired.

Figure 14:
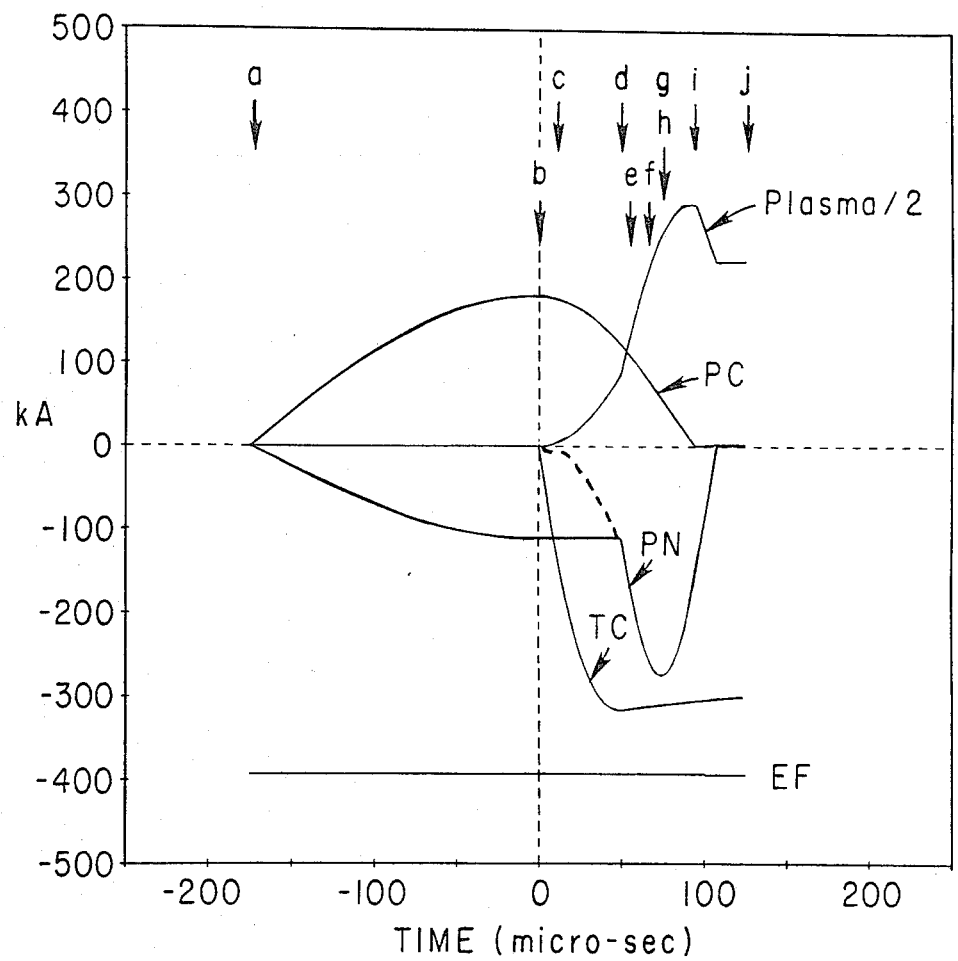
FIG. 14 is a graphical representation of the time variation of the currents in the plasma, toroidal, poloidal, pinch and equilibrium field coils of the present invention.

The PC current trace in shown in FIG. 14. As indicated, the PC current is initiated about 175 microseconds before time zero, which corresponds to the time at which the TC is pulsed. The PC current builds up to a peak value of about 180 KA at time zero, and the discharge continues until current zero. At this point the triggered switches are blocking.

TABLE 5
PC CAPACITOR BANK PARAMETERS

| | |
|---|---|
| For 3 Turns | |
| Total Capacitance Required | 673.8 Micro-Farad |
| Total Voltage Required | 30.1 Kilo-Volt |
| Total Capacitor Energy | 305.6 Kilo-Joule |
| For 3 Interleaves | |
| Capacitance Per Interleave | 2.021 Milli-Farad |
| Voltage Per Interleave | 10.04 Kilo-Volt |

Figure 15:
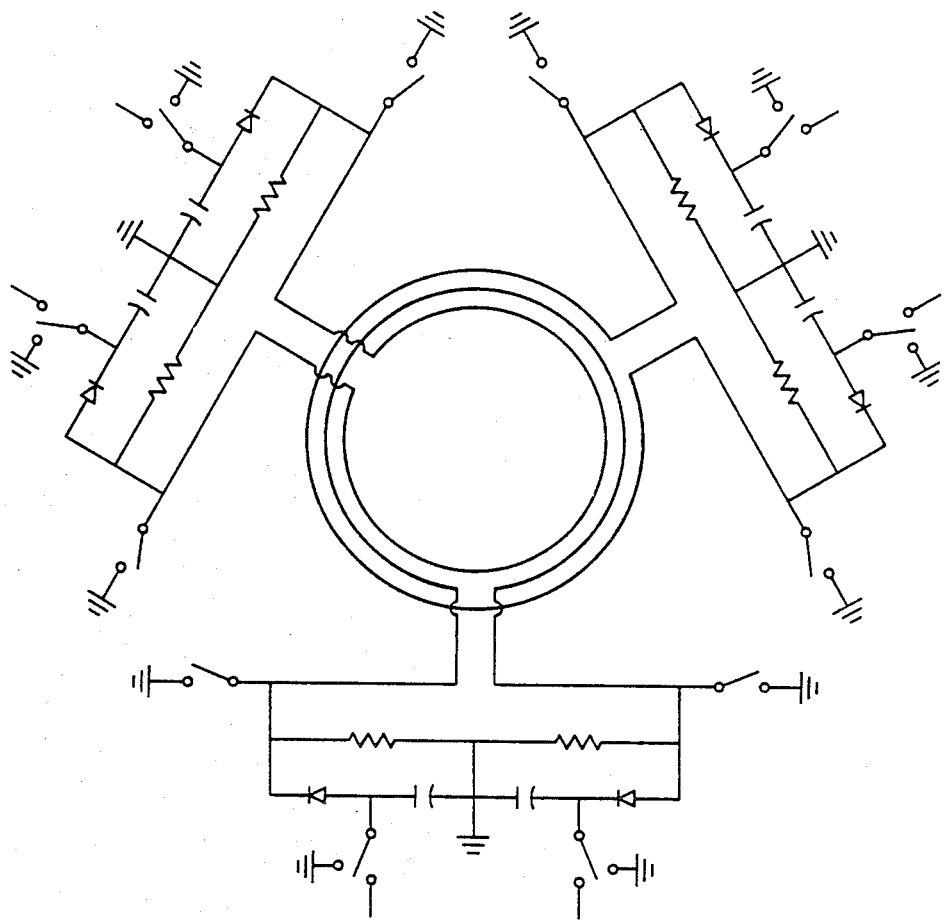

FIG. 15 and Table 6 show the power supply of the TC coil and the parameters of its capacitor bank. It consists of three interleaves, each containing capacitor bank charging and discharging circuits. Interleaves are designed to minimize the ground insulation of coils.

The TC current trace is also shown in FIG. 14, where time zero is the initiation time of the TC current pulse. This current can start from either zero or from a small positive current provided by a "slow" (low voltage) capacitor bank. The TC discharge progresses from zero to peak current of about −317 kA in 50 microseconds. A crowbar circuit is provided to terminate the discharge and permit current decay.

TABLE 6
TC CAPACITOR BANK PARAMETERS

| | |
|---|---|
| For 36 Turns | |
| Total Capacitance Required | 198.1 Micro-Farad |
| Total Voltage Required | 58.2 Kilo-Volt |
| Total Capacitor Energy | 336.0 Kilo-Joule |
| For 3 Interleaves | |
| Capacitance Per Interleave | 594.2 Micro-Farad |
| Voltage Per Interleave | 19.4 Kilo-Volt |

FIG. 16 depicts the power supply of the pinch coils, and Table 7 gives the capacitor bank parameters. The power supply consists of four identical interleaves, and the associated diodes and capacitor banks with charge and discharge circuits. The midpoint of each power supply is grounded, thus halving the line to ground voltage. The triggered switching devices are conservatively designed, so that they will block full reverse voltage after a half cycle discharge. Some resistance may be added to damp the discharge circuit and lessen the blocking voltage if desired. The PN current trace is depicted in FIG. 14, the solid line and the dotted line illustrating two different modes for pulsing the PN coils, as more fully explained subsequently.

TABLE 7

PN CAPACITOR BANK PARAMETERS

| For 1 Turn | |
|---|---|
| Total Capacitance Required | 78.66 Micro-Farad |
| Total Voltage Required | 67.15 Kilo-Volt |
| Total Capacitor Energy | 177.3 Kilo-Joule |
| For 4 Interleaves | |
| Capacitance per Interleave | 314.6 Micro-Farad |
| Voltage per Interleave | 16.8 Kilo-Volt |

FIG. 17 depicts the power supply for the EF coil. As noted above, this coil is supplied by a DC generator having a 650 volt, 23,000 amp pulse capacity. The generator is capable of increasing the EF coil current to desired level in 6 seconds. The EF current trace is shown in FIG. 14, the EF coils having been turned on at an early stage in the formation procedure and then have maintained a constant field during the course of the formation process.

The ceramic shells for the ring core 2 and the PN coils within the vacuum chamber act as non-conductive vacuum barriers to prevent outgassing from copper or epoxy surfaces, as both the flux ring and the PN coils require outgassing protection. Due to the relative fraility of the ceramics, the shells do not act as structural support in any way. Rather, they are mechanically isolated from the vacuum chamber through bellows, and are separated from the ring core 2 and PN coils by a soft insulation-filled gap.

Both the ring core 2 and the PN coils are toroidal in shape. The ring core ceramic torus is approximately $\frac{3}{8}''$ thick and the PN coil ceramic torus is approximately $\frac{1}{4}''$ thick. Since available alumina type ceramics cannot duplicate the exact toroidal shape, the ceramics shells are formed of fused segments, each comprising six degrees of major radius arc. Thus, sixty of these segments make up a complete torus, which is then split equatorially to allow insertion of the respective coils. Each six-degree segment has a cast depression around its outer circumference that is $\frac{1}{8}''$ deep by $\frac{1}{4}''$ wide. This depression provides a recess in which a filamentary glass tape is used as banding to compress a "T" shaped Viton seal joining the torus halves.

The seal is protected from the plasma by small minor-radius arc segments of ceramic. Six, $\frac{1}{4}''$-wall ceramic tubes, used to cover co-axial leads, are fused directly onto equatorial halves at 120° spacings. Attachment to the vacuum chamber, as previously noted, is through steel bellows. The details of construction of the ring core ceramic are depicted in FIG. 18.

The vacuum vessel 1 is made up of three $\frac{1}{2}''$-thick type-304 stainless steel segments. They include two dished heads, with constant-radius dishes, and one central-rolled cylinder. The heads are 150-cm-radius preformed weldments which are commercially available. The central-rolled segment, also 150 cm in radius, is hard-welded to the lower head. The joint between the cylinder and the upper dome is flanged, allowing access from the top of the machine. A dummy flange, welded at the lower dome/cylinder weld line, assures symmetrical eddy current effects.

The basic porting scheme consists of 20-cm and 40-cm ports, arranged alternately on 45° radial lines from the machine center line. In total, there sixteen 40-cm ports and sixteen 20-cm ports. Additional ports are provided for the vacuum pump, and for the toroidal coil, poloidal coil, and pinch coil lead outs. Two large ports, 70-cm, at the top and bottom of the machine are arranged coaxially on the vertical center line. Eight 20-cm ports are also provided on the horizontal midplane, equi-spaced about the equator of the vessel. The main vacuum tank seal, at the parting flange, is of Viton O-ring design. External clamps spaced around the outside of the flange are used for seal compression. All ports are also of Viton O-ring design.

The volume of the vacuum vessel is approximately 9000 liters, and the gas load for the vacuum pumping system is mostly outgassing of the materials used for construction of the vacuum vessel. In order to pump down the vessel in approximately 50 minutes, a mechanical pump of high capacity is required. The vacuum pumping system includes a 12" gate valve, a 1500 liter per second turbo molecular pump, a 150 liter per second blower, and a 30 liter per second mechanical pump. A single pump system is used which is provided with a large enough diameter pump line to achieve a net pumping speed of 1200 liters per second at the vacuum vessel. The system is capable of achieving a base pressure of $8 \times 10^{-8}$ torr. For attaining lower pressures of approximately $10^{-8}$ torr, titanium getters may be employed.

The Formation Process

As indicated in FIG. 14, the operating procedure used in the formation process is to pulse up the vacuum poloidal field at a time when there is no current present in the toroidal field winding, and then to initiate the plasma discharge by pulsing the toroidal core current. A special feature of this arrangement is the inhibition of premature breakdown during the rise of the poloidal field, since the induced electric field is purely toroidal. Alternatively, a controlled pre-heating discharge may be created before the initiation of the main discharge. In this case, a slow-rising current can be used to provide a positive toroidal coil bias. The effect is to generate poloidal electric field and permit a plasma current to flow.

Initially, the entire vacuum vessel will be evacuated and then filled to a neutral pressure of about a micron. The pulsing of the toroidal field circuit will ionize a plasma layer at the ceramic surface of the ring 2, and will "unpinch" it away from the surface. That is, the toroidal field circuit will $\overline{E} \times \overline{B}$ drift the particles so as to maintain their initial positions within the magnetic flux pattern. As the discharge volume expands, neutral gas will be swept up by thermal motion, which is not negligible on the approximately 50 $\mu$second time scale of the formation process. With this overview, the formation process will now be described in detail.

Figure 19A:
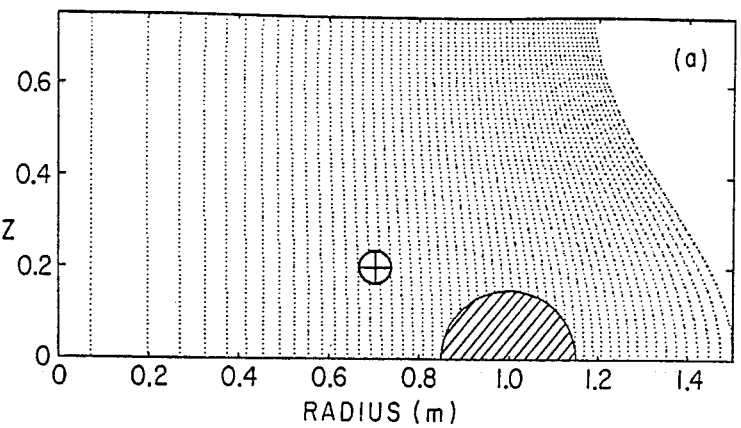
FIGS. 19a–19i illustrate poloidal magnetic flux contours at various stages of the plasma formation procedure, with the field in the plasma region being denoted by solid contours.

As the first step in the formation process, current is allowed to flow through the EF system, causing a poloidal flux pattern to penetrate the vacuum vessel as shown in FIG. 19a. This field by itself has the appropriate strength and field curvature to support the final spheromak equilibrium. Since the EF system is nominally driven by a generator, the time necessary to bring the field up to the desired strength is quite long as compared to the poloidal, toroidal, and pinch coil systems, which are driven by fast capacitor banks.

During the comparatively short pulse time of the fast circuits, the initial EF field can be considered to be "frozen" in the vacuum chamber wall, where large eddy currents are induced.

Figure 19B:
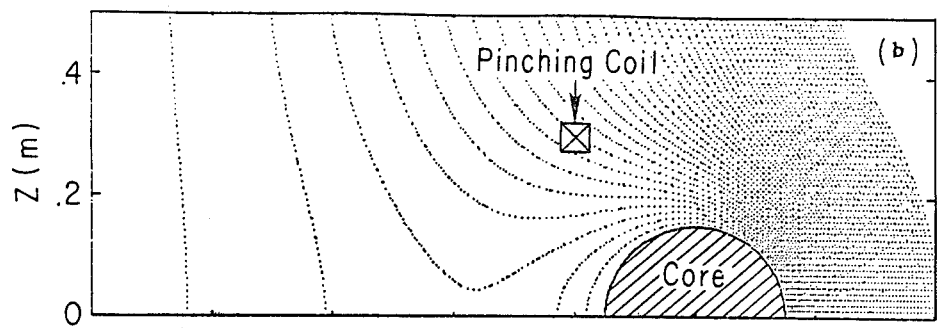

Next, the poloidal coil is pulsed, producing a toroidal current in the ring core 2 which induces an external poloidal field, which, when superposed with the field produced by the EF coils, assumes the configuration depicted in FIG. 19b. As can easily be seen in this figure, the effect of the external field produced by the EF coils is to strengthen the poloidal field on the large major radius side, and weaken it on the small major radius side (i.e. toward the axis) of the core 2, as exhibited by the presence of a separatrix. The purpose of this pattern is to ensure that the field pressure balance within the plasma will cause an expansion towards the major axis.

Figure 19C:
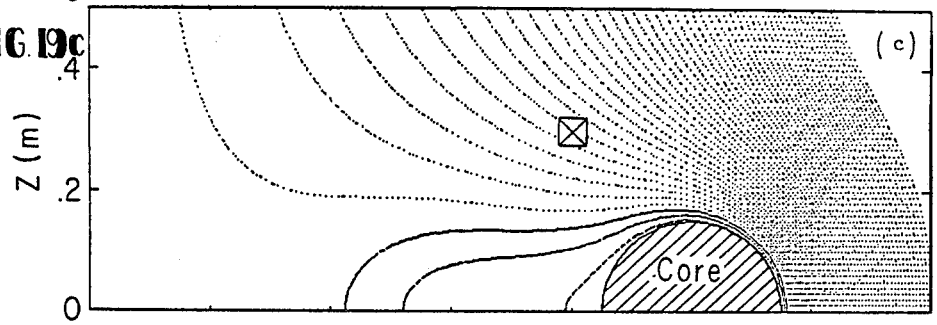
Figure 19D:
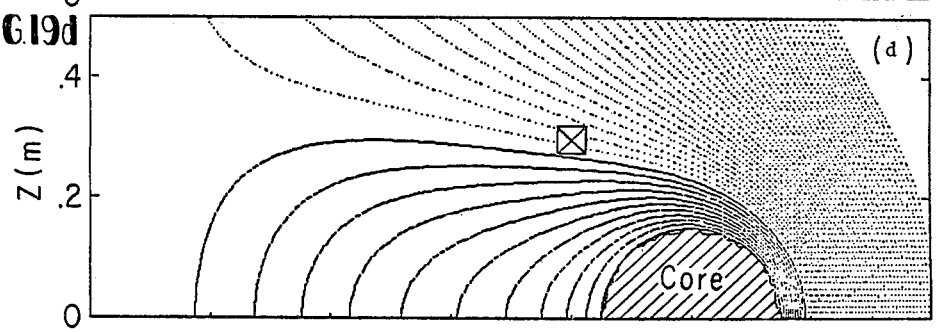

The toroidal coil is now energized to cause a plasma discharge to be initiated around the periphery of the core 2, and toroidal flux appears outside of the core, inducing a poloidal plasma current. At the same time, the poloidal coil is adding poloidal flux to the plasma, which lifts off from the core, as illustrated in FIG. 19c. This figure corresponds to the stage when approximately ½ of the toroidal flux has been induced and trapped within the poloidal flux. In FIG. 19d, the toroidal flux has continued to "inflate" the poloidal flux, with the toroidal field pressure gaining additional strength as the trapped flux region shifts toward the axis. If the poloidal field generating current in the ring core were turned off instantaneously at this stage, a detached spheromak plasma would be produced, and indeed, this procedure is the one used in the example following this discussion. Turning the current off quasi-statically, i.e., relatively slowly, however, would simply lead to a collapse of the entire plasma back onto the ring core 2.

Figure 19E:
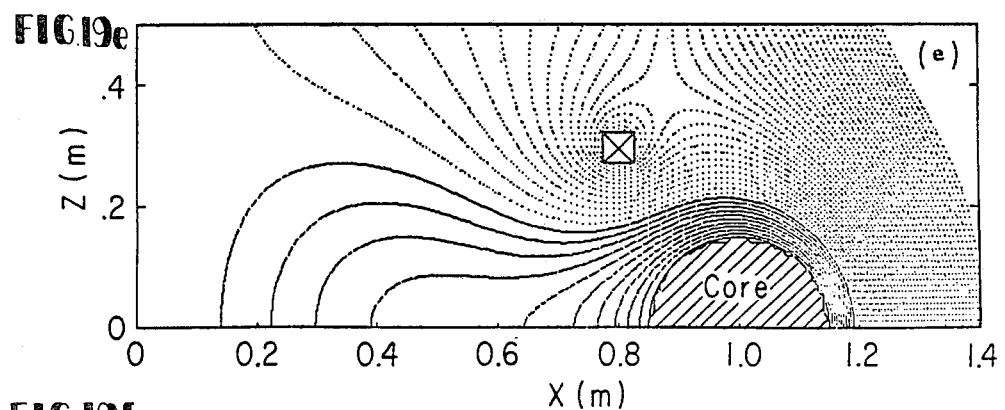
Figure 19F:
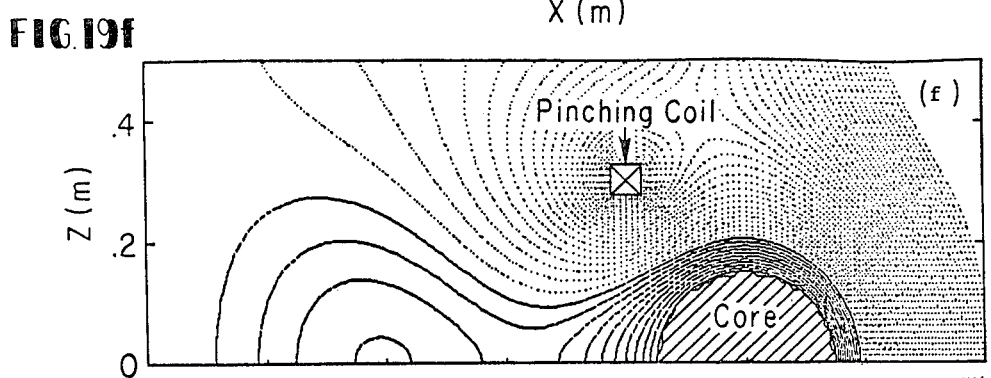
Figure 19G:
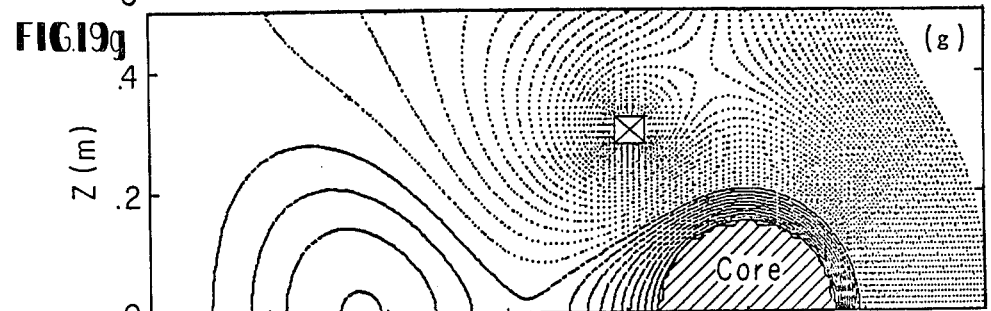
Figure 19H:
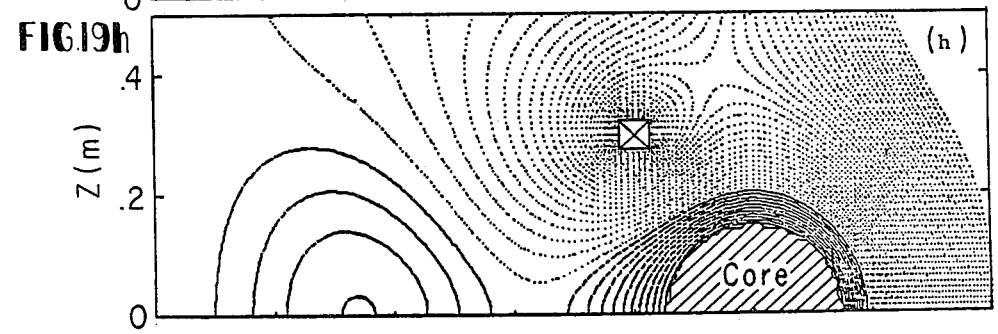

Thus, a quasi-static formation process requires energization of the pinch coils, as illustrated in FIG. 19e. As illustrated in FIGS. 19e through 19g, the magnitude of the field produced by the pinch coil is allowed to gradually increase, and begins to sever the "spheromak section" of the plasma from the core. During this time, a separatrix develops in the plasma, and the poloidal field lines break, forcing the reconnection of the poloidal magnetic field within the detached plasma, as illustrated in FIG. 19h. The pinch coil current according to this process is depicted by dotted line in FIG. 14.

Figure 19I:
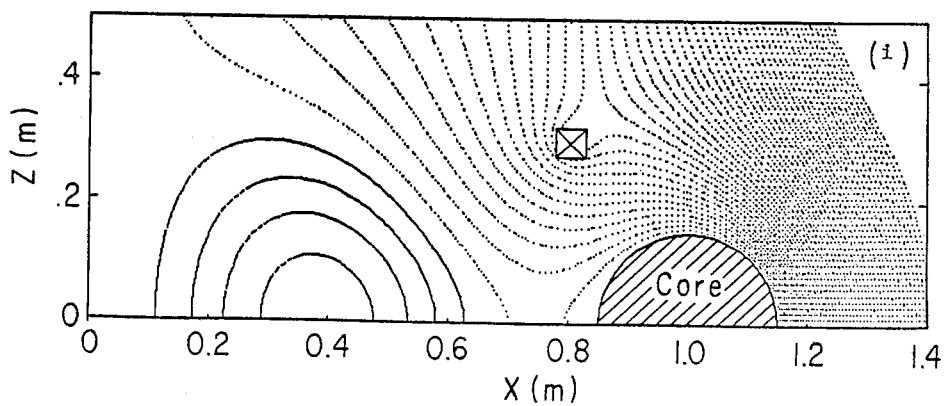
Figure 19J:
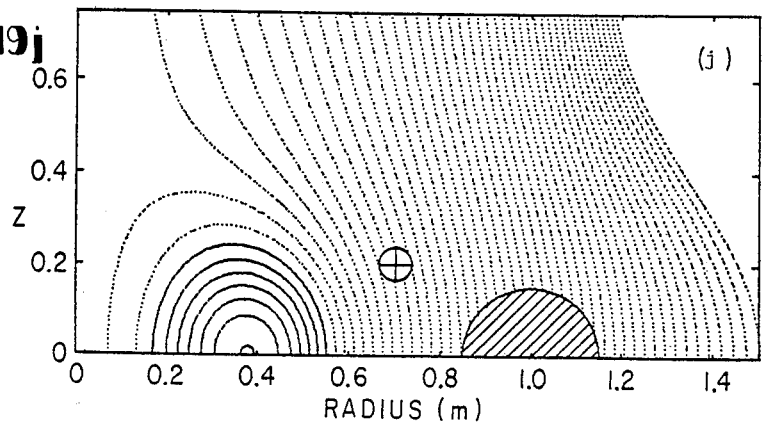

In the final stage depicted by FIG. 19i, the spheromak plasma has been completely detached, and the currents in the ring core 2 can be allowed to decay. When the pinch coil is deenergized, the final equilibrium of FIG. 19j is supported by the initial EF field. Thus, care must be taken that the final vertical field due to the EF coils have an appropriately weak curvature so as to allow stable centering of the detached spheromak plasma.

Figure 20:
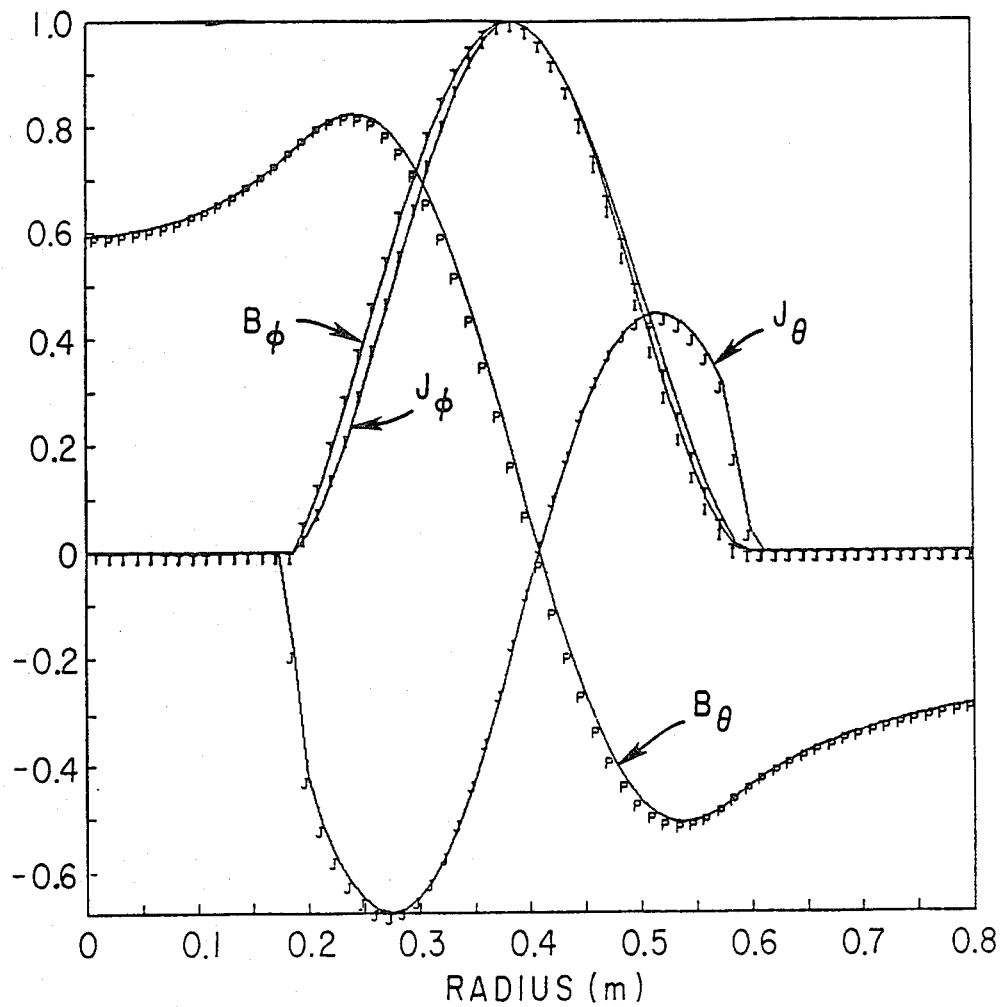
FIG. 20 is a graphical representation of the midplane field and current densities for the equilibrium configuration.

The midplane field and current profiles of the spheromak plasma are shown in FIG. 20, and FIG. 14 summarizes the time dependence of the current levels in the four active systems and identifies each of the steps of the process described above in time. Since plasma resistivity will cause loss of toroidal flux during formation, toroidal flux values well in excess of that required for the final equilibrium can be generated from the present core and transferred to the spheromak plasma.

The efficiency with which the toroidal flux is transferred from the core to the spheromak plasma is typically very high, and may approach 75% when the resistivity of the plasma is not taken into account.

The final poloidal plasma current in the spheromak is about the same as the initial toroidal current in the ring core 2, but total magnetic energy in the final spheromak configuration is always substantially smaller than the peak energy that appears in the forming coils. The potential inefficiency associated with this feature can be reduced by further optimizing the formation process and by recovering the pulsed magnetic energy of the coils.

An alternative formation scheme has also been devised and differs from the above-described process in only a few respects. Particularly, the pinch coil is pulsed on at the same time as the poloidal core, and the pinch coil current is subsequently pulsed up rapidly after the energization of the toroidal coil. The purpose of the initial bias on the pinch coils is to protect this system from the plasma. Since the field of the pinch coils is brought up part way at an earlier stage, the toroidal flux emitted from the ring core 2 will drive the poloidal flux into the constriction between the pinch coils, thus causing the poloidal field reconnection process to begin automatically. The time variation of the currents in the plasma and the respective coils according to this alternative procedure are illustrated in FIG. 14 (solid line). As is easily seen, the alternative formation scheme is somewhat more optimal from the point of view of pulsed power requirements than that of the previously described process.

Having now discussed in detail the constructional details of the device and the formation process, the results of an actual operational "run" will be described, by way of the following example.

EXAMPLE

The machine configuration and the main components used represent scaled-down versions (1:6) of the above-described apparatus, i.e., a working prototype model, the operable components of the prototype being the same. The ring core contains the poloidal flux coil and the toroidal flux core. These two coil systems induce the toroidal and poloidal currents of the initial plasma. The equilibrium field coils (EF) hold the final spheromak plasma in an appropriate position near the center of the vessel. The vacuum vessel is made of 3/8" stainless steel with no insulating breaks since it constitutes a passive element in the overall spheromak magnetic circuit.

The principal parameters of the prototype model are summerized in the following table:
Rmaj=15 cm
Rmin=3 cm
TOROIDAL COIL CURRENT≦60 kA-Turn
POLOIDAL COIL CURRENT≦1.0 MA-Turn
TOTAL MAGNETIC ENERGY≦10 kJ
FORMATION TIME∼10 μsec
MAXIMUM $V_{TOR}$∼10 kV
MAXIMUM $V_{POL}$∼1 kV
EQUILIBRIUM FIELD 1 kG The EF coils, are driven by a DC current generator. The PC, TC, and PN coils are all driven by fast capacitor banks. The ring core 2 contains toroidal and poloidal copper windings housed in an insulating ceramic material. It is capable of emitting 0.003 volt-seconds of toroidal flux and can induce 0.02 volt-seconds of poloidal flux change. The core is covered by a three-mil thick metallic liner of stainless steel which not only protects the core surface from sputtering and erosion, but will also smooth an induced field at the initial break-down stage. The core is self-supported against induced forces by upper and lower vertical supports.

The two core currents were drawn into the flux core in correspondence with the sequence as previously disclosed, the EF coils being turned on first, and the PC coil being pulsed subsequently in order to create a weak field region on the small major radius side of the core. The plasma discharge was initiated around the core with the energization of the TC coil, and the plasma began expanding toward the major axis of the system. The generated toroidal and poloidal plasma currents were about 20 kA and 50 kA, respectively. The uniformity of the plasma with respect to the toroidal direction was found to be very satisfactory, although small ripple effects from the toroidal core windings were observed.

The plasma moved toward the major axis as expected, and the operational sequence was the same as that previously described, with the exception that the pinch coils were not energized. As previously discussed, it is possible to produce a detached spheromak plasma without the use of the pinch coils by turning off the poloidal-field-generating current in the ring core 2 rapidly after the plasma has sufficiently expanded toward the major axis. Thus, by crowbarring the TC and PC currents at $T=10$ $\mu$sec and $T=12$ $\mu$sec., respectively, a detached spheromak equilibrium configuration was established at approximately 12–14 $\mu$sec. after the start of the plasma discharge.

The efficiency of capturing toroidal field from the ring core 2 was less than 50%, and the detached spheromak configuration was seen to last approximately 30 $\mu$sec, a significantly long time since the classical magnetic diffusion time of the plasma is of the same order. Thus, the effectiveness of the formation scheme for producing a stable spheromak plasma was proven.

Thus, the foregoing description and drawings have disclosed an improved method and apparatus for the formation of a detached spheromak plasma, wherein a plasma is first formed about a core containing toroidal and poloidal field generating coils, and is then expanded toward the center of the vacuum vessel. A detached plasma is formed by pinchng off a portion of the extended plasma, and is maintained in position by external coils.

This invention has been described by way of illustration rather than limitation, and it is intended to cover in the appended claims all variations and modifications as fall within the true spirit and scope of the invention.

We claim:

1. An apparatus for producing and confining a spheromak plasma, comprising:
   a generally spheroidal vacuum vessel having a major axis and an equatorial midplane;
   equilibrium field coil means for producing an equilibrium magnetic field directed primarily along the major axis;
   a ring core disposed within said vacuum vessel symmetrically with respect to said major axis and said equatorial midplane, and having a minor axis in said equatorial plane surrounding said major axis, a major radius and a minor radius, said ring core including a toroidal flux coil wound about said minor axis and a separate poloidal flux coil and being supported within said vacuum vessel by a plurality of ring supports, said ring supports housing conductors for supplying current to said poloidal and toroidal flux coils;
   means for energizing said equilibrium field coils at a time $t_1$ to create a first poloidal magnetic field within said vacuum vessel;
   means for energizing said poloidal flux coil at a time $t_2 > t_1$ to create a second poloidal magnetic field within said vacuum vessel, said first and second poloidal fields being superposed to form a composite poloidal field whose strength is greater on a radially exterior major radius side of said ring core, than on a radially interior major radius side of said ring core;
   means for energizing said toroidal flux coil at a time $t_3 > t_1$ for initiating a plasma discharge within said vacuum vessel outside said toroidal flux coil, said ring core and said equilibrium field coils being operable to cause said plasma to become expanded and distended toward said major axis; and
   means for pinching off a portion of said distended plasma, whereby a detached spheromak plasma concentric with, and having a major radius less than the major radius of, said ring core is produced.

2. An apparatus for producing and confining a spheromak plasma, comprising:
   a vacuum chamber having a major axis and an equatorial midplane,
   first coil means for producing a first poloidal magnetic field in said vacuum chamber at a time $t_1$,
   a ring core having a minor axis surrounding said major axis disposed symmetrically within said vacuum chamber with respect to said equatorial plane and said major axis, said ring core including:
      second coil means for producing a second poloidal vacuum magnetic field in said vacuum chamber at a time $t_2 > t_1$, said second poloidal vacuum magnetic field being a time-varying field; and
      third coil means for producing a time varying toroidal vacuum magnetic field inside said ring core at a time $t_3 > t_1$, and for initiating in the presence of a gas outside said ring core a plasma discharge in said vacuum chamber outside said ring core;
   said first and second poloidal magnetic fields, when superposed, forming a composite poloidal magnetic field having a strength which is weaker on a radially interior major radius side of said ring core than on a radially exterior major radius side of said ring core, such that said plasma expands into the region of weaker magnetic field; and
   means for pinching off a portion of said expanded plasma and for causing reconnection of the magnetic field lines thereof, thereby forming a detached spheromak plasma concentric with, and having a major radius less than the major radius of, said ring core.

3. An apparatus according to claim 1 or 2, wherein said vacuum chamber comprises a multi-part spheroidal shell formed of stainless steel.

4. An apparatus according to claim 1 or 2, further comprising vacuum pumping means for evacuating the interior of said vacuum chamber.

5. An apparatus according to claim 2, wherein said first coil means comprises a pair of equilibrium field coils disposed externally of said vacuum vessel and displaced at equal distances above and below said equatorial midplane.

6. An apparatus according to claim 1 or 5, further comprising generator means for energizing said equilibrium field coils in series.

7. An apparatus according to claim 6, wherein said equilibrium field coils comprise a plurality of toroidally arranged extruded copper conductors, each having a central cooling bore therein.

8. An apparatus according to claim 1 or 5, wherein said equilibrium field coils are operable to produce a magnetic field having a strength and curvature sufficient to support the detached plasma.

9. An apparatus according to claim 1 or 2, further comprising a ceramic shell for housing, and for preventing out-gassing from, said ring core.

10. An apparatus according to claim 9, wherein said ceramic shell comprises a plurality of fused segments.

11. An apparatus according to claim 2, wherein said ring core means is supported in said vacuum vessel by a plurality of ring supports, and said second coil means comprises a poloidal flux coil.

12. An apparatus according to claim 1 or 11, wherein said poloidal flux coil is divided into three sections, each section consisting of one turn and traversing 360° of the major circumference of said ring core means, and 120° of the minor circumference of said ring core means.

13. An apparatus according to claim 12, wherein each of the bottom ring supports contains an electrical lead for said poloidal flux coil.

14. An apparatus according to claim 2, wherein said third coil means comprises a toroidal flux coil.

15. An apparatus according to claim 1 or 14, wherein said toroidal flux coil is divided into three sections, each section comprising an electrical lead and two coarse pitch helical coils wound over one another, one of said helical coils being a lefthand coil, and the other of said coils being a right-hand coil.

16. An apparatus according to claim 15, wherein each said toroidal flux coil sections traverses 120° of the major circumference of said ring core means.

17. An apparatus according to claim 1 or 2, wherein said pinching means comprises a pair of pinch coils, disposed within said vacuum chamber and symmetrically with respect to said major axis, and displaced at equal distances with respect to said equatorial plane.

18. An apparatus according to claim 1 or 2, wherein said pinching means comprises means operable to produce a time-varying magnetic field at a time $t_4$ for forcing reconnection of the poloidal magnetic field lines and for severing off a portion of the plasma.

19. An apparatus according to claim 18, wherein said time $t_4$ satisfies $t_1 < t_2 \leq t_4$.

20. An apparatus according to claim 19, wherein said time $t_4$ satisfies $t_4 > t_3$.

21. An apparatus according to claim 1 or 2, wherein said pinching means comprises means for crowbarring at least the poloidal magnetic field generating current after the plasma has become extended.

22. A method for producing and confining a spheromak plasma, comprising:
evacuating a vacuum vessel and filling said vessel with a neutral species,
producing a first poloidal magnetic field by pulsing a current through a pair of toroidal equilibrium field coils,
producing a second poloidal magnetic field by pulsing a current through a poloidal field generating coil of a ring core, such that said first and second poloidal magnetic fields are superimposed to form a composite poloidal field having first and second regions, the poloidal field in said second regin being stronger than the poloidal field in said first region,
producing a toroidal vacuum magnetic field inside said ring core by passing a current through a toroidal field generating coil of said ring core, thereby initiating a plasma discharge in said vacuum vessel outside said ring core and causing toroidal flux to appear outside of said ring core,
expanding the plasma in the direction of said first region, and
pinching off a portion of said expanded plasma so as to cause poloidal magnetic field line reconnection within the pinched-off portion, thereby producing a detached spheromak plasma concentric with, and having a major radius less than the majors radius of, said ring core.

23. The method of claim 22, wherein the first poloidal magnetic field is of a strength and curvature sufficient to support the detached plasma.

24. The method of claim 22, wherein said pinching step comprises crowbarring at least the poloidal field generating coil of said ring core.

25. The method of claim 24, wherein said crowbarring step further comprises crowbarring the toroidal field generating coil of said ring core before the poloidal field generating coil is crowbarred.

26. The method of claim 22, wherein said pinching step comprises energizing a pair of pinch coils earlier than the initiation of said plasma discharge, and subsequently increasing the current flowing in said coils after said plasma has become extended.

27. The method of claim 22, wherein said pinching step comprises energizing a pair of pinch coils simultaneously with the step of producing said second poloidal magnetic field, so as to provide an initial bias on said pinch coils to protect them from the plasma, and subsequently increasing the current flowing in said coils after said plasma has become extended.

28. The method of claim 22, wherein said toroidal field generating coil is provided with an initial bias to produce an initial toroidal magnetic field before the step of producing said toroidal magnetic field, so as to provide an ionized plasma just prior to the initiation of the main plasma discharge.

29. The method of claim 22, wherein said expanding is effectuated by trapping the toroidal flux within the poloidal flux, such that the poloidal flux is inflated with increasing toroidal flux.

30. An apparatus for producing and confining a spheromak plasma, comprising:
a vacuum vessel having a major axis and an equatorial midplane;
equilibrium field coil means for producing an equilibrium magnetic field directed primarily along the major axis;
a ring core disposed within said vacuum vessel symmetrically with respect to said major axis and said equatorial midplane, and having a minor axis in said equatorial plane wound about said major axis, a major radius and a minor radius, said ring core including a toroidal flux coil surrounding said minor axis and a separate poloidal flux coil and being supported within said vacuum vessel by a plurality of ring supports, said ring supports housing conductors for supplying current to said poloidal and toroidal flux coils;

means for energizing said equilibrium field coils at a time $t_1$ to create a first poloidal magnetic field within said vacuum vessel;

means for energizing said poloidal flux coil at a time $t_2 > t_1$ to create a second poloidal magnetic field within said vacuum vessel, said first and second poloidal fields being super-imposed to form a composite poloidal field whose strength is greater on a radially exterior major radius side of said ring core, than on a radially interior major radius side of said ring core;

means for energizing said toroidal flux coil at a time $t_3 > t_1$ for initiating a plasma discharge within said vacuum vessel, said ring core and said equilibrium field coils being operable to cause said plasma to become expanded and distended toward said major axis; and means, located on said radially interior side of said ring core, for pinching off a portion of said distended plasma, whereby a detached spheromak plasma is produced.

31. An apparatus for producing and confining a spheromak plasma, comprising:

a vacuum chamber having a major axis and an equatorial midplane, first coil means for producing a first poloidal magnetic field in said vacuum chamber at a time $t_1$, a ring core having a minor axis surrounding said major axis disposed symmetrically within said vacuum chamber with respect to said equatorial plane and said major axis, said ring core including:

second coil means for producing a second poloidal vacuum magnetic field in said vacuum chamber at a time $t_2 > t_1$, said second poloidal vacuum magnetic field being a time-varying field; and third coil means operative for producing a time varying toroidal magnetic field inside said ring core at a time $t_3 > t_1$, and for initiating in the presence of a gas a plasma discharge in said vacuum chamber;

said first and second poloidal magnetic fields, when superimposed, forming a composite poloidal magnetic field having a strength which is weaker on a radially interior major radius side of said ring core than on a radially exterior major radius side of said ring core, such that said plasma expands into the region of weaker magnetic field; and means, located on said radially interior side of said ring core, for pinching off a portion of the expanded plasma and for causing reconnection of the magnetic field lines thereof, thereby forming a detached spheromak plasma.

32. A method for producing and confining a spheromak plasma, comprising:

evacuating a vacuum vessel and filling said vessel with a neutral species;

producing a first poloidal magnetic field by pulsing a current through a pair of toroidal equilibrium field coils;

producing a second poloidal magnetic field by pulsing a current through a poloidal field generating coil of a ring core, such that said first and second poloidal magnetic fields are superimposed to form a composite poloidal field having first and second regions, the poloidal field in said second region being stronger than the poloidal field in said first region;

producing a toroidal magnetic field inside said ring core by passing a current through a toroidal field generating coil of said ring core, thereby initiating a plasma discharge and causing toroidal flux to appear outside of said ring core; expanding the plasma in the direction of said first region; and pinching off a portion of said expanded plasma with a pinching coil located in said first region so as to cause poloidal magnetic field line reconnection within the pinched-off portion, thereby producing a detached spheromak plasma.

* * * * *